United States Patent
Yamamoto et al.

(10) Patent No.: US 7,461,111 B2
(45) Date of Patent: Dec. 2, 2008

(54) METHOD OF UNIFORMING PHYSICAL RANDOM NUMBER AND PHYSICAL NUMBER GENERATION DEVICE

(75) Inventors: Hiroyasu Yamamoto, Shinbashi (JP); Ananda Vithanage, Shinbashi (JP); Takakuni Shimizu, Shinbashi (JP); Kaoru Fujita, Shinbashi (JP); Hatsumi Nakano, Shinbashi (JP); Takaaki Shiga, Shinbashi (JP); Ryuji Soga, Shinbashi (JP); Masayoshi Katono, Shinbashi (JP); Toshiyuki Watanabe, Shinbashi (JP); Misako Koibuchi, Shinbashi (JP)

(73) Assignee: FDK Corporation, Tokyo (JP)

( * ) Notice: Subject to any disclaimer, the term of this patent is extended or adjusted under 35 U.S.C. 154(b) by 702 days.

(21) Appl. No.: 10/528,910

(22) PCT Filed: Sep. 25, 2003

(86) PCT No.: PCT/JP03/12213

§ 371 (c)(1),
(2), (4) Date: Mar. 23, 2005

(87) PCT Pub. No.: WO2004/031941

PCT Pub. Date: Apr. 15, 2004

(65) Prior Publication Data

US 2006/0040731 A1    Feb. 23, 2006

(30) Foreign Application Priority Data

Sep. 30, 2002  (JP) ............................ 2002-285168
Apr. 4, 2003   (JP) ............................ 2003-101085
Aug. 18, 2003  (JP) ............................ 2003-294101

(51) Int. Cl.
*G06F 7/58*   (2006.01)

(52) U.S. Cl. ..................................... 708/255; 708/801

(58) Field of Classification Search ................ 708/255, 708/801
See application file for complete search history.

(56) References Cited

U.S. PATENT DOCUMENTS

| 6,070,178 | A  | * | 5/2000  | Anderson et al. | 708/3 |
| 6,571,263 | B1 | * | 5/2003  | Nagai           | 708/3 |
| 6,751,639 | B2 | * | 6/2004  | Szajnowski      | 708/250 |
| 7,028,059 | B2 | * | 4/2006  | Williams        | 708/250 |
| 7,124,157 | B2 | * | 10/2006 | Ikake           | 708/255 |
| 2003/0014452 | A1 | * | 1/2003 | Le Quere       | 708/250 |

FOREIGN PATENT DOCUMENTS

| JP | 61-97746  | 5/1986 |
| JP | 62-109082 | 5/1987 |

(Continued)

OTHER PUBLICATIONS

Benjamin Jun et al., "The Intel Random Number Generator", Cryptography Research, published on Apr. 22, 1999 (p. 4, 4.3 Digital Post-Processing).

*Primary Examiner*—David H Malzahn
(74) *Attorney, Agent, or Firm*—Wenderoth, Lind & Ponack, L.L.P.

(57) ABSTRACT

A method of uniforming physical random numbers while concurrently maintaining a random number generating rate and ensuring security. The method sequentially inputs a plurality of physical random numbers to a shift register to hold them there, and shifts them every time a reference pulse signal rises. Physical random numbers held in the shift register are randomly selected and output by a selector based on part of them. Accordingly, physical random numbers input to the shift register are uniformed and then output even thought they have a deviation, thereby eliminating the chance of not outputting random numbers or letting others recognize the deviation of random numbers.

20 Claims, 23 Drawing Sheets

FOREIGN PATENT DOCUMENTS

| | | |
|---|---|---|
| JP | 1-258130 | 10/1989 |
| JP | 8-18550 | 1/1996 |
| JP | 9-97170 | 4/1997 |
| JP | 2001-344094 | 12/2001 |
| JP | 2003-29963 | 1/2003 |
| JP | 2003-93620 | 4/2003 |

* cited by examiner

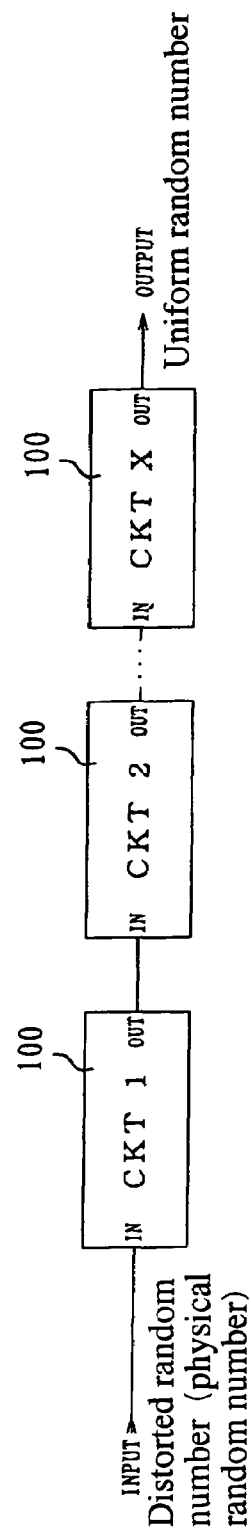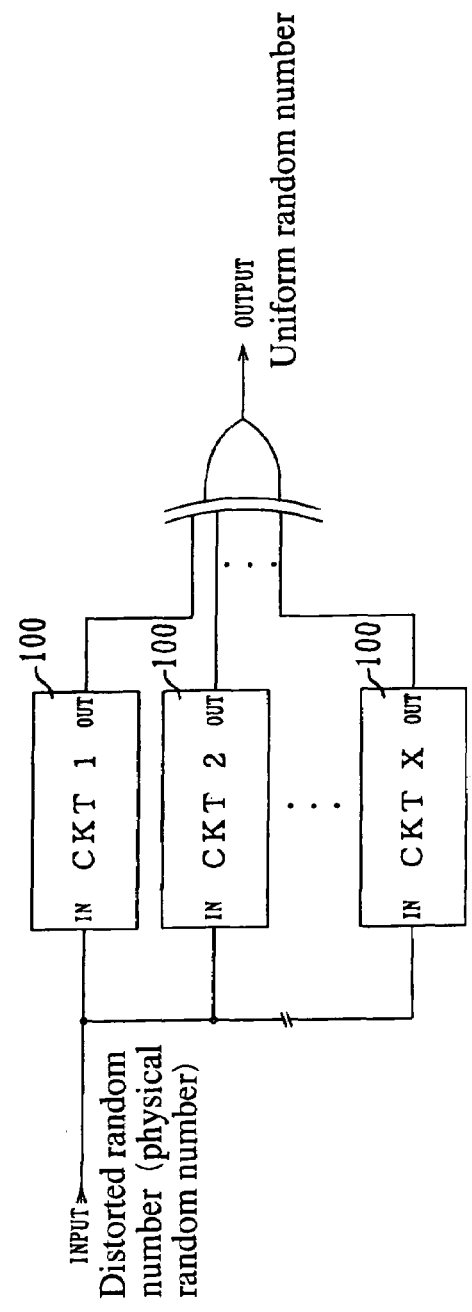
FIG. 3A
FIG. 3B

Physical random number generator having serial and holding parallel output

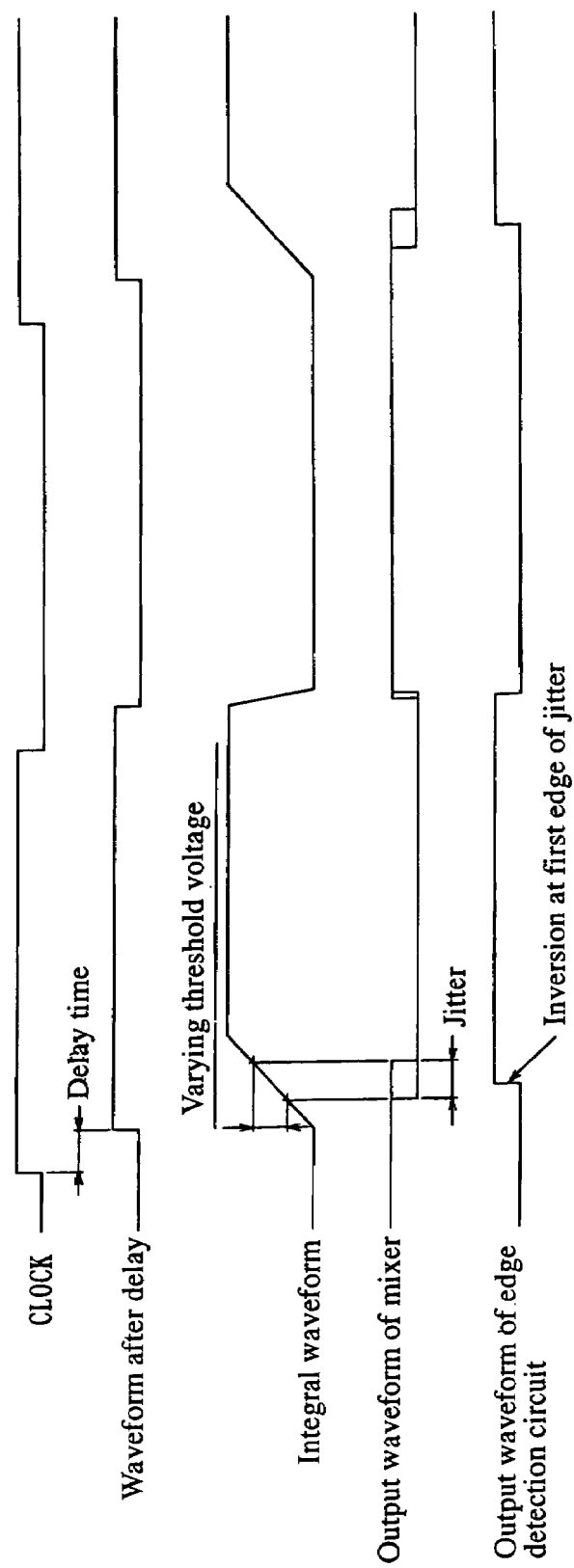

METHOD OF UNIFORMING PHYSICAL RANDOM NUMBER AND PHYSICAL NUMBER GENERATION DEVICE

BACKGROUND OF THE INVENTION

1. Field of the Invention

The present invention relates to a method of uniforming physical random numbers, in which physical random numbers can be simply uniformed.

Further, the present invention relates to a physical random number generation device suitable for various uses, in which the specific uses include security, encryption, authentication, locking, coded communication, smart cards (e.g., electronic money, credit card, consultation ticket), home security, car security, keyless entry, probability, lottery, game, amusements (e.g., pinball, slot machine), simulations (e.g., Monte Carlo in meteorological or scientific computation or stock price), graphics (e.g., CG, automatic composition), control, measurement, FA, and robot control (artificial intelligence).

2. Description of the Related Art

Generally, random numbers include a pseudo-random number deterministically generated by computation and a physical random number generated using a physical phenomenon in the natural world. The latter (physical random number) is generated based on a random phenomenon in a true meaning and has a disposition of an ideal random number. However, when physical random numbers are actually generated, various error factors intervene in the intermediate process, and the ideal random number is not necessarily output, possibly producing the deviated random number. The error factors include a width of clock for reference in making the digitization and a mixed excess noise in using the noise.

As a conventional method for improving a deviation in the physical random numbers, or as a conventional method for uniforming the physical random numbers, a Neumann collector for improving a deviation in the random numbers, employing two binary random numbers (e.g., refer to "non-patent document" stated below), and a method for improving a deviation in the physical random numbers by synthesizing the physical random numbers generated based on the noise with the pseudo-random numbers (herein after referred to as a random number synthesis method) were proposed (e.g., refer to Japanese Patent Laid-Open No. 2001-344094, paragraphs [0014] to [0018] and FIG. 1, and non-patent document, Benjamin Jun and Paul Kocher, "The Intel Random Number Generator", CRYPTOGRAPHY RESEARCH, published on 1999.4.22 (page 4, 4.3. Digital Post-Processing)).

However, the Neumann collector has a drawback that the generation rate of random number is decreased, because two-bit random numbers are required to output one-bit random numbers, and there is the chance of not outputting random numbers depending on the combination of two bits.

Also, the random number synthesis method has an inconvenience of letting others recognize the deviation of random numbers and lacking the safety, because, if the pseudo-random number is known, then the physical random number as a basis can be taken out of the output.

Most conventional physical random number generation devices as previously described employ the noise occurring in a semiconductor, in which some are connected to the personal computer from the outside and have large size and some generate the random numbers in an IC chip simplex. For amusements, when a temporally random signal occurs, the random number may be given by referring to the value of a high speed counter provided.

Generally, it is difficult for the physical random number generator to generate random numbers at high rate, and a large amount of random numbers may be often required beyond the random number generating rate. Therefore, it is considered that a storage medium is provided to store random numbers, or the amount of generating the random numbers is increased, employing a plurality of physical random number generation devices, although it is necessary for the user to construct a complex circuit to realize this.

Also, generally, the physical random number may possibly change the quality of the random number depending on the use environment, but it is beneficial that the user checks whether or not the random number generated by the physical random number generation device is usable as the genuine random number. However, to test the random numbers, a dedicated measuring apparatus must be constructed, and it is difficult for the general user of the physical random number generation device to accept such an operation taking excess cost and trouble. Since the testing of random numbers deals with a large amount of data, the storage device storing it needs a large capacity, and it takes a lot of time to perform a computation processing for testing.

Moreover, the conventional physical random number generation device is well known to have a physical random number generator comprising a phase adjuster having two delays and a selector, and a physical random number generator having a flip-flop and a feedback circuit, as disclosed in Japanese Patent Laid-Open No. 2003-29964, for example.

However, this conventional physical random number generation device requires two delays and the selector corresponding to two systems of signal line inputted into a clock terminal and a data terminal of the flip-flop, leading to an inconvenience that the scale of the phase adjuster or the physical random number generator is increased, the occupancy area is expanded, and the consumption power is increased. Especially when the physical random number generator is mixed in an IC (Integrated Circuit) with a lot of functions of CPU (Central Processing Unit), ROM (read only memory), and RAM (random access memory), it is strongly demanded that the occupancy area of the physical random number generator is reduced.

BRIEF SUMMARY OF THE INVENTION

In the light of the above-mentioned problems, an object of the present invention is to provide a method of uniforming physical random numbers, capable of maintaining a random number generating rate and ensuring security concurrently.

Also, another object of the invention is to provide a physical random number generation device with a high utilization efficiency of random number in a simplex, and easily generating random numbers at high rate by assembling a plurality of physical random number ICs, in which the quality of random numbers can be easily checked for use.

Moreover, another object of the invention is to provide a physical random number generator with a small occupancy area and a small consumption power, and a physical random number generation device incorporating the physical random number generator.

First of all, a first aspect of the prevent invention provides a method of uniforming physical random numbers. This method includes inputting a plurality of physical random numbers to a random number holding device to hold them, employing a part of physical random numbers held in the random number holding device as an address of a selector, and randomly selecting and outputting physical random numbers from the residual part, based on the address.

Also, a second aspect of the invention provides a method of uniforming physical random numbers, comprising randomly selecting the random numbers held in the random number holding device, employing a logical product circuit, instead of the selector, and outputting an exclusive OR of them.

Further, a third aspect of the invention provides the method of uniforming physical random numbers according to the first aspect of the invention, wherein an exclusive OR circuit that inputs the output of the selector and the physical random number is provided, its output being input into the random number holding device.

Also, a fourth aspect of the invention provides a method of uniforming physical random numbers, comprising uniforming physical random numbers at multiple stages by repeating, for two or more cycles, the operation according to any of the first through third aspects of the invention.

Also, a fifth aspect of the invention provides the method of uniforming physical random numbers according to any one of the first through fourth aspects of the invention, wherein a shift register is employed as the random number holding device.

The numeral in parentheses designates the corresponding element in the drawings for convenience sake. Accordingly, the present invention is not limited to the description or the drawings. This is the same as in the appended claims.

A sixth aspect of the invention provides a physical random number generation device having a physical random number generator, the physical random number generator comprising a serial physical random number generator for generating a serial random number in accordance with a reference clock signal, a serial/parallel converter for converting the serial random number to a parallel random number, a plurality of registers capable of holding the parallel random number, and a control circuit for sequentially holding the parallel random number in the registers every time the parallel random number is generated by the serial/parallel converter, and reading and outputting the parallel random number from the register in accordance with a read clock signal, as well as successively updating the contents of the registers by shifting the parallel random number from the other register to the register for which the reading is ended. Herein, the read clock is input separately from the reference clock.

Also, a seventh aspect of the invention provides the physical random number generation device according to the fourth aspect of the invention, wherein the physical random number generator comprises an up/down counter for deciding a register to hold the parallel random number among the plurality of registers and outputting a write address, a selector for selecting the register to hold the parallel random number, based on the write address output by the up/down counter, to output a load signal, and a control circuit for sequentially holding the parallel random numbers in the serial/parallel converter from the latter stage register to the former stage register among the registers, based on the load signal from the selector, and reading and outputting the parallel random number from the last stage register among the registers in accordance with a read clock signal, as well as sequentially shifting the parallel random number within each register residing at the former stage of the register to the latter stage.

Also, an eighth aspect of the invention provides the physical random number generation device according the sixth or seventh aspects of the invention, wherein the physical random number generator comprises a total counter for counting the total number of serial random numbers generated by the serial physical random number generator, and a random number verification circuit for verifying the uniformity of random numbers, based on the serial random numbers, when the total number of serial random numbers counted by the total counter reaches a predetermined bit number.

Also, a ninth aspect of the invention provides the physical random number generation device according to the eighth aspect of the invention, wherein a random number verification method for the random number verification circuit comprises verifying the uniformity of random numbers by counting the appearance frequency of a random number value "0" or "1" and comparing it with a prescribed value.

Also, a tenth aspect of the invention provides the physical random number generation device according to the eighth aspect of the invention, wherein a random number verification method for the random number verification circuit comprises verifying the uniformity of random numbers by comparing a $\chi$ square value calculated based on the appearance frequency of each random number value with a prescribed value, with one random number value being 4 bits.

Also, an eleventh aspect of the invention provides the physical random number generation device according to the eighth aspect of the invention, wherein the random number verification method for the random number verification circuit comprises verifying the uniformity of random numbers by counting the appearance frequency of string for every length of string and comparing it with a prescribed value.

Also, a twelfth aspect of the invention provides the physical random number generation device according to the eighth aspect of the invention, wherein the random number verification method for the random number verification circuit comprises verifying the uniformity of random numbers by comparing the length of the longest string appearing in the random numbers of certain bits with a prescribed value.

Also, a thirteenth aspect of the invention provides the physical random number generation device according to any one of the sixth through the twelfth aspects of the invention, further comprising the chip select and output enable functions and the corresponding terminals, in which a buffer function of an output section has three states.

Further, a fourteenth aspect of the invention provides the physical random number generation device according to any one of the sixth through the twelfth aspects of the invention, further comprising a plurality of physical random number generators, in which one physical random number generator is selected from among the physical random number generators, based on a select signal of the selector, to output the random number or random number verification data.

Moreover, a fifteenth aspect of the invention provides a physical random number generator comprising two integration circuits for integrating a clock signal through a resistor and a capacitor to output an integral waveform, two noise sources, two amplifiers for amplifying the noise of the noise source to output a noise signal, two mixers for mixing the integral waveform and the noise signal, and two edge detection circuits for detecting the first edge of jitter generated based on an output waveform of the mixer, a flip-flop for outputting "0" or "1" based on a phase difference in the output signal between the edge detection circuits, a phase adjuster for adjusting the phase of an input signal input into the each integration circuit, the phase adjuster having a delay, a first selector and an up/down counter, and a feedback circuit for feeding back the output of the flip-flop to the phase adjuster so that "0" or "1" output from the flip-flop may converge to 50%, wherein a second selector and a third selector are provided at the former stage of the each integration circuit, and a polarity switching circuit for switching the polarity of input for the first selector, the second selector and the third selector by the most significant bit of the up/down counter is provided.

Moreover, a sixteenth aspect of the invention provides a physical random number generator comprising one integration circuit for integrating a clock signal through a resistor and a capacitor to output an integral waveform, two noise sources, two amplifiers for amplifying the noise of the noise source to output a noise signal, two mixers for mixing the integral waveform and the noise signal, and two edge detection circuits for detecting the first edge of jitter generated based on an output waveform of the mixer, and a flip-flop for outputting "0" or "1" based on a phase difference in the output signal between the edge detection circuits, wherein a variable delay composed of a delay and a selector to adjust the phase of an input signal input into the flip-flop is provided at the former or latter stage of each edge detection circuit, and a feedback circuit for feeding back the output of the flip-flop to the variable delay so that "0" or "1" output from the flip-flop may converge to 50%.

Moreover, in the physical random number generator, a FET (Field Effect Transistor) may be additionally provided in parallel to the capacitor of the integration circuit at the latter stage of the resistor of the integration circuit.

Also, in the physical random number generator, a constant current circuit may be provided instead of the resistor in the integration circuit.

BRIEF DESCRIPTION OF THE DRAWINGS

FIGS. 3A and 3B are circuit diagrams showing still another two examples of the random number uniforming circuit to which the method of uniforming physical random numbers, according to the present invention, is applied;

FIG. 23 is a chart showing the operation waveforms of the physical random number generator using the integration circuit as shown in FIG. 22.

DETAILED DESCRIPTION OF THE INVENTION

First Embodiment

The preferred embodiments of the present invention will be described below with reference to the drawings.

Figure 1A:
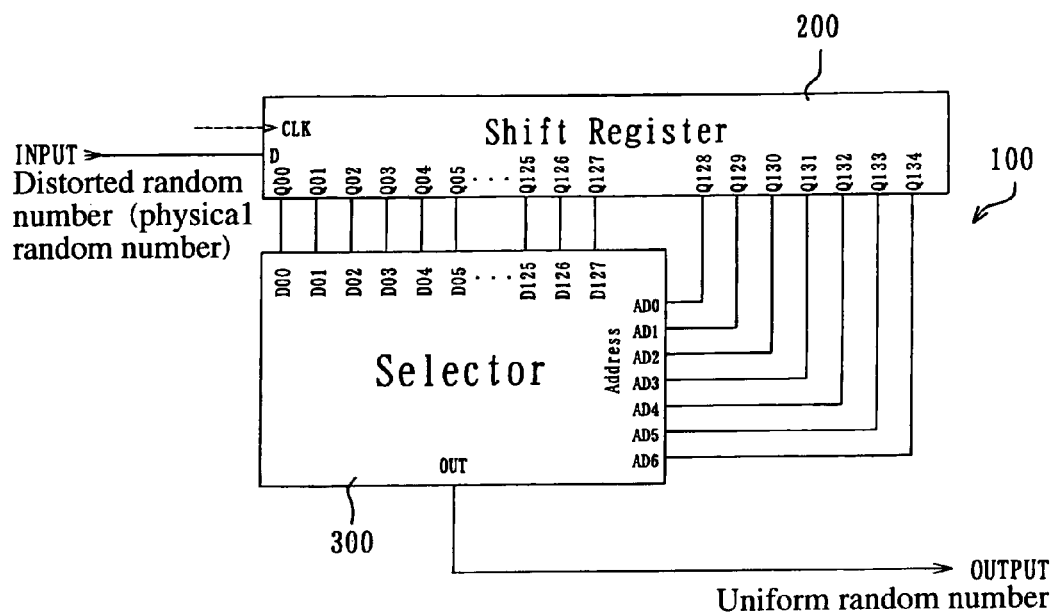
FIGS. 1A and 1B are circuit diagrams showing two examples of a random number uniforming circuit to which a method of uniforming physical random numbers, according to the present invention, is applied.

First of all, a random number uniforming circuit 100 as shown in FIG. 1A comprises a shift register 200 and a selector 300, in which binary random numbers ("0" or "1") are sequentially input into a data terminal D of the shift register 200, and shifted to the outputs Q00 to Q134 every time a reference pulse signal input into a clock terminal CLK of the shift register 200 rises. And the random numbers of 128 bits in the outputs Q00 to Q127 of the shift register 200 are input into the data terminals D00 to D127 of the selector 3, and the random numbers of 7 bits in the outputs Q128 to Q134 of the shift register 200 are input into the addresses AD0 to AD6 of the selector 300.

Thereafter, in the selector 300, one bit is selected from the random numbers of 128 bits input into the data terminal D00 to D127 in accordance with the address value of 7 bits input into the addresses AD0 to AD6 and output from an output terminal OUT. For example, when "1", "0", "0", "0", "0", "0" and "0" are input into the addresses AD0 to AD6, the random number input into the data terminal D00 is output from the output terminal OUT. Also, when "1", "0", "1", "0", "0", "0" and "0" are input into the addresses AD0 to AD6, the random number input into the data terminal D04 is output from the output terminal OUT.

In this way, since binary random numbers sequentially input into the data terminal D of the shift register 200 randomly select themselves based on part of them as the address, binary random numbers are uniformed by the random number uniforming circuit 1 even though they have a deviation. And unlike the conventional Neumann collector, the random numbers of plural bits are not required to output the random number of one bit, and there is no chance of not outputting random numbers, maintaining a random number generating rate. Also, unlike the conventional random number synthesis method, there is no chance of letting others recognize the deviation of random numbers, ensuring safety.

Figure 1B:
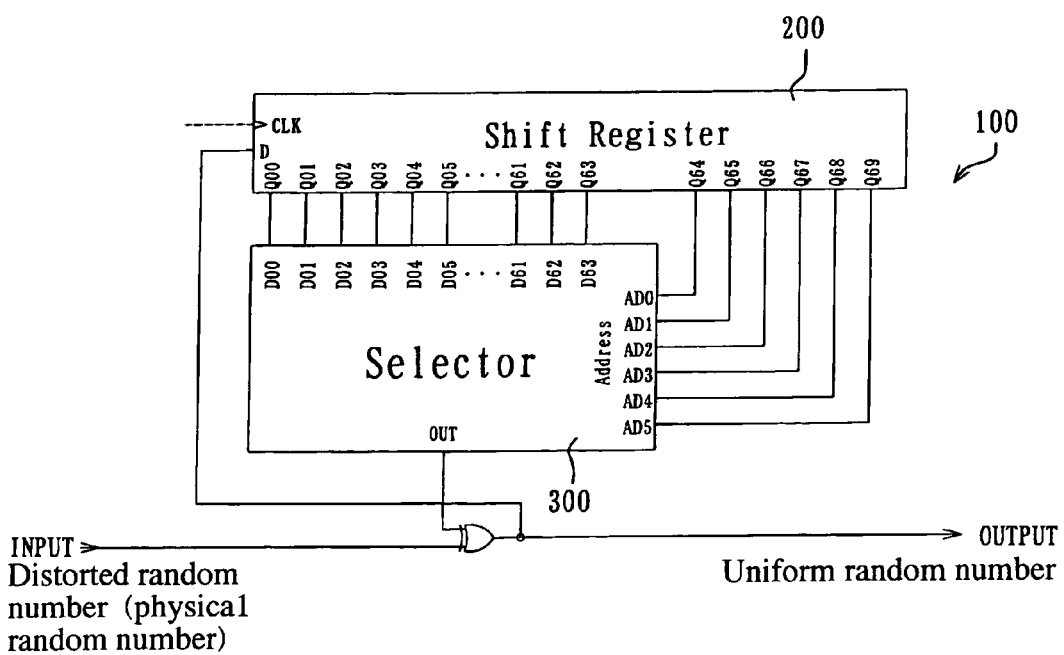

Also, the random number uniforming circuit 100, as shown in FIG. 1B, is the same as the random number uniforming circuit 1 as shown in FIG. 1A, except that the number of bits, for selecting the random number output from the shift register 200 is reduced to 6 bits, and an exclusive OR (XOR) circuit is added. That is, the random number uniforming circuit 1 as shown in FIG. 1B comprises the shift register 200 and the selector 300, in which the outputs of the exclusive OR circuit inputting the output of the selector 300 and binary random numbers ("0" or "1") are sequentially input into the data terminal D of the shift register 200, and shifted to the outputs Q00 to Q69 every time a reference pulse signal input into the clock terminal CLK of the shift register 200 rises. And the random numbers of 64 bits in the outputs Q00 to Q63 of the shift register 200 are input into the data terminals D00 to D63 of the selector 300, and the random numbers of 6 bits in the outputs Q64 to Q69 of the shift register 200 are input into the addresses AD0 to AD5 of the selector 300. Thereafter, in the selector 300, one bit is selected from the random numbers of 64 bits input into the data terminals D00 to D63 in accordance with the address value of 6 bits input into the addresses AD0 to AD5 and output from the output terminal OUT.

In this case, since binary random numbers sequentially input into the data terminal D of the shift register 200 select themselves randomly based on part of them as the address, binary random numbers are uniformed by the random number uniforming circuit 100 even though they have a deviation, maintaining a random number generating rate and ensuring safety.

To confirm this, the uniformity of random numbers output from the random number uniforming circuit 100 was evaluated in conformance with the random number testing standard FIPS 140-2. The results are listed in Tables 1 and 2. The numerical values in Table 1 indicate the original data, and the numerical values in Table 2 indicate the test result data. Herein, in Tables 1 and 2, "Mono", "Poker", "Runs" and "LongRuns" designate the kind of random number test, and correspond to "Monobit Test", "Porker Test", "Runs Test" and "Long Runs Test" in the random number testing standard FIPS 140-2. Also, the numerical values results are indicated with one set of 50 tests, and the numerical value indicates the number of disqualification in the 50 tests.

TABLE 1

| Set No. | Mono | Poker | Runs | LongRuns |
|---|---|---|---|---|
| 1 | 0 | 0 | 1 | 0 |
| 2 | 0 | 0 | 0 | 0 |
| 3 | 0 | 0 | 1 | 0 |
| 4 | 0 | 0 | 1 | 0 |
| 5 | 0 | 0 | 1 | 0 |
| 6 | 0 | 0 | 2 | 0 |
| 7 | 0 | 0 | 0 | 0 |
| 8 | 0 | 0 | 0 | 0 |
| 9 | 0 | 0 | 1 | 0 |
| 10 | 0 | 0 | 0 | 0 |
| 11 | 0 | 0 | 0 | 0 |
| 12 | 0 | 0 | 0 | 0 |
| 13 | 0 | 0 | 0 | 0 |
| 14 | 0 | 0 | 1 | 0 |
| 15 | 0 | 0 | 0 | 0 |
| 16 | 0 | 0 | 1 | 0 |
| 17 | 0 | 0 | 1 | 0 |
| 18 | 0 | 0 | 0 | 0 |
| 19 | 0 | 0 | 0 | 0 |
| 20 | 0 | 0 | 0 | 0 |
| 21 | 0 | 0 | 1 | 1 |
| 22 | 0 | 0 | 1 | 0 |
| 23 | 0 | 0 | 1 | 0 |
| 24 | 0 | 0 | 0 | 0 |
| 25 | 0 | 0 | 0 | 0 |
| 26 | 0 | 0 | 1 | 0 |
| 27 | 0 | 0 | 0 | 0 |
| 28 | 0 | 0 | 0 | 0 |
| 29 | 0 | 0 | 1 | 0 |
| 30 | 1 | 0 | 0 | 0 |
| 31 | 0 | 0 | 0 | 1 |
| 32 | 0 | 0 | 1 | 0 |
| 33 | 0 | 0 | 0 | 0 |
| 34 | 0 | 0 | 0 | 0 |
| 35 | 0 | 0 | 0 | 1 |
| 36 | 0 | 0 | 1 | 0 |
| 37 | 0 | 0 | 1 | 0 |
| 38 | 0 | 0 | 0 | 0 |
| 39 | 0 | 0 | 0 | 0 |
| 40 | 0 | 0 | 0 | 0 |
| 41 | 0 | 0 | 0 | 0 |
| 42 | 0 | 0 | 0 | 0 |
| 43 | 0 | 0 | 1 | 0 |
| 44 | 0 | 0 | 0 | 0 |
| 45 | 0 | 0 | 0 | 0 |
| 46 | 0 | 0 | 2 | 0 |
| 47 | 0 | 0 | 0 | 0 |
| 48 | 0 | 0 | 1 | 0 |
| 49 | 0 | 0 | 0 | 0 |
| 50 | 0 | 0 | 0 | 0 |

TABLE 2

| Set No. | Mono | Poker | Runs | LongRuns |
|---|---|---|---|---|
| 1 | 0 | 0 | 0 | 0 |
| 2 | 0 | 0 | 0 | 0 |
| 3 | 0 | 0 | 0 | 0 |
| 4 | 0 | 0 | 0 | 0 |
| 5 | 0 | 0 | 0 | 0 |
| 6 | 0 | 0 | 0 | 0 |
| 7 | 0 | 0 | 0 | 0 |
| 8 | 0 | 0 | 0 | 0 |
| 9 | 0 | 0 | 0 | 0 |
| 10 | 0 | 0 | 0 | 0 |
| 11 | 0 | 0 | 0 | 0 |
| 12 | 0 | 0 | 0 | 0 |
| 13 | 0 | 0 | 0 | 0 |
| 14 | 0 | 0 | 0 | 0 |
| 15 | 0 | 0 | 0 | 0 |
| 16 | 0 | 0 | 0 | 0 |
| 17 | 0 | 0 | 0 | 0 |
| 18 | 0 | 0 | 0 | 0 |
| 19 | 0 | 0 | 0 | 0 |
| 20 | 0 | 0 | 0 | 0 |
| 21 | 0 | 0 | 0 | 0 |
| 22 | 0 | 0 | 0 | 0 |
| 23 | 0 | 0 | 1 | 0 |
| 24 | 0 | 0 | 0 | 0 |
| 25 | 0 | 0 | 0 | 0 |
| 26 | 0 | 0 | 0 | 0 |
| 27 | 0 | 0 | 0 | 0 |
| 28 | 0 | 0 | 0 | 0 |
| 29 | 0 | 0 | 0 | 0 |
| 30 | 0 | 0 | 0 | 0 |
| 31 | 0 | 0 | 0 | 0 |
| 32 | 0 | 0 | 0 | 0 |
| 33 | 0 | 0 | 0 | 0 |
| 34 | 0 | 0 | 0 | 0 |
| 35 | 0 | 0 | 0 | 0 |
| 36 | 0 | 0 | 0 | 0 |
| 37 | 0 | 0 | 0 | 0 |

TABLE 2-continued

| Set No. | Mono | Poker | Runs | LongRuns |
|---|---|---|---|---|
| 38 | 0 | 0 | 0 | 0 |
| 39 | 0 | 0 | 0 | 0 |
| 40 | 0 | 0 | 0 | 0 |
| 41 | 0 | 0 | 1 | 0 |
| 42 | 0 | 0 | 0 | 0 |
| 43 | 0 | 0 | 0 | 0 |
| 44 | 0 | 0 | 0 | 0 |
| 45 | 0 | 0 | 0 | 0 |
| 46 | 0 | 0 | 0 | 0 |
| 47 | 0 | 0 | 0 | 0 |
| 48 | 1 | 0 | 0 | 0 |
| 49 | 0 | 0 | 0 | 0 |
| 50 | 0 | 0 | 0 | 0 |

As will be clear from the Tables 1 and 2 above, in all four kinds of random number tests ("Mono", "Poker", "Runs" and "LongRun"), almost all of set Nos. 1 to 50 had eligible values, and the above effect was confirmed.

Figure 2A:
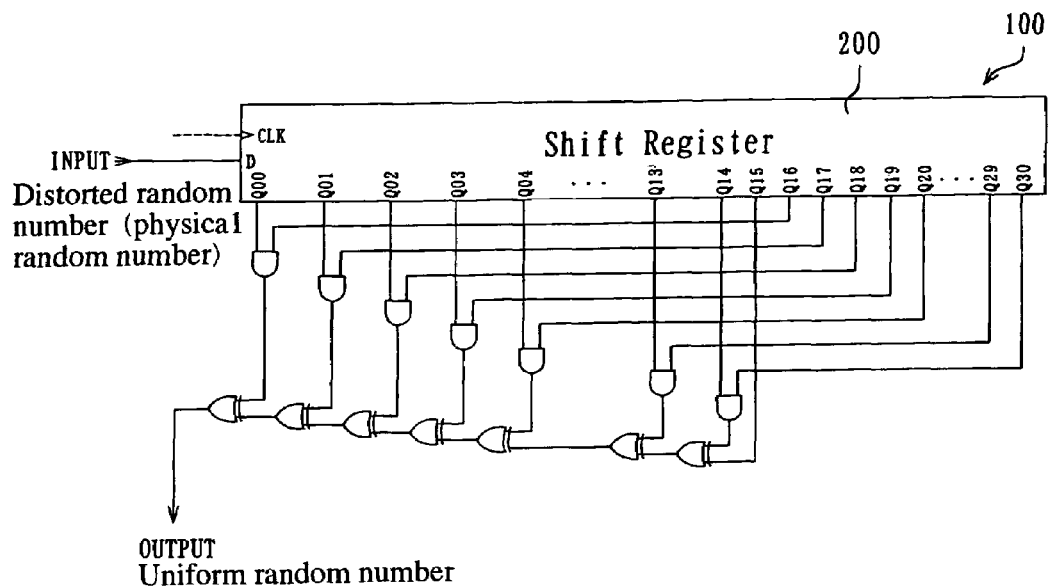
FIGS. 2A and 2B are circuit diagrams showing another two examples of the random number uniforming circuit to which the method of uniforming physical random numbers, according to the present invention, is applied.

On the other hand, the random number uniforming circuit 1 as shown in FIG. 2A is the same as the random number uniforming circuit 100 as shown in FIG. 1A, except that the number of bits to select the random number output from the shift register 200 is increased to 15 bits, and a combination of logical product (AND) circuits and exclusive OR (XOR) circuits is substituted for the selector 300. That is, the random number uniforming circuit 100 as shown in FIG. 2A comprises the shift register 200, in which binary random numbers ("0" or "1") are sequentially input into the data terminal D of the shift register 200, and, shifted to the outputs Q00 to Q30 every time a reference pulse signal input into the clock terminal CLK of the shift register 200 rises. And the outputs of 15 logical product circuits inputting the random numbers of 15 bits in the outputs Q00 to Q14 of the shift register 200 and the random numbers of 15 bits in the outputs Q16 to Q30 of the shift register 200 are sequentially synthesized with the output Q15 of the shift register 200 in the exclusive OR circuits and output.

In this way, binary random numbers sequentially input into the data terminal D of the shift register 200 are divided into two groups of the same bit number (15 bits) within the shift register 200, and arithmetically operated randomly in the logical product circuits and the exclusive OR circuits. Therefore, binary random numbers are uniformed and output by the random number uniforming circuit 1 even though they have a deviation. And unlike the conventional Neumann collector, the random numbers of plural bits are not required to output the random number of one bit, and there is no chance of not outputting random numbers, maintaining a random number generating rate. Also, unlike the conventional random number synthesis method, there is no chance of letting others recognize the deviation of random numbers, ensuring safety.

Figure 2B:
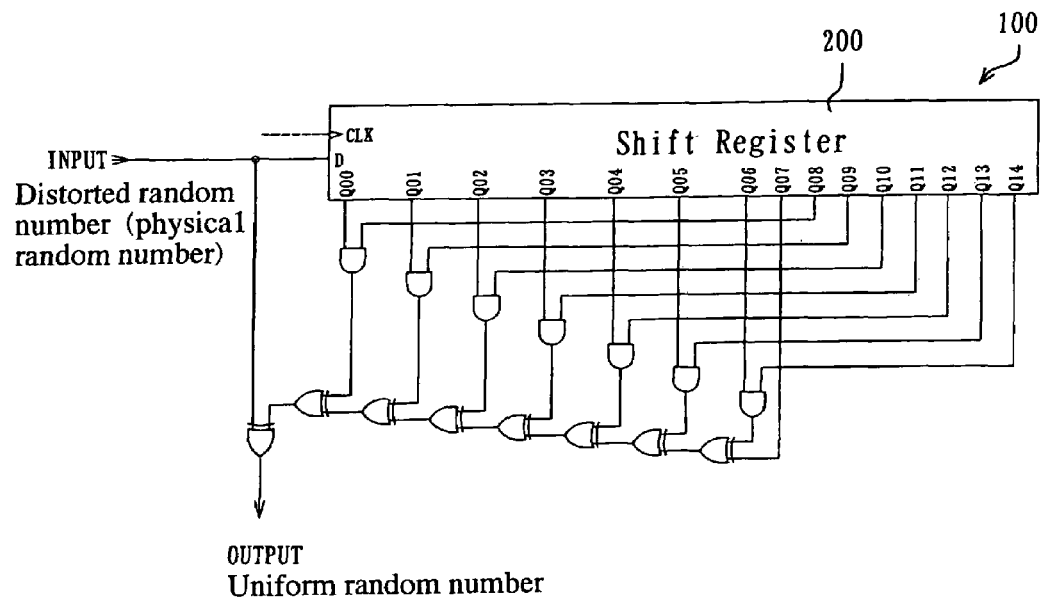

Also, the random number uniforming circuit 100, as shown in FIG. 2B, is the same as the random number uniforming circuit 100, as shown in FIG. 2A, except that the number of bits to select the random number output from the shift register 200 is reduced to 7 bits, and the exclusive OR (XOR) circuit is added. That is, the random number uniforming circuit 100 as shown in FIG. 2B comprises the shift register 200, in which binary random numbers ("0" or "1") are sequentially input into the data terminal D of the shift register 200, and shifted to the outputs Q00 to Q14 every time a reference pulse signal input into the clock terminal CLK of the shift register 200 rises. And the outputs of seven logical product circuits inputting the random numbers of 7 bits in the outputs Q00 to Q06 of the shift register 200 and the random numbers of 7 bits in the outputs Q08 to Q14 of the shift register 200 are sequentially synthesized with the output Q07 of the shift register 200 in the exclusive OR circuits, finally synthesized with the original binary random number (raw data) in the exclusive OR circuit and output.

In this case, binary random numbers sequentially input into the data terminal D of the shift register 200 are divided into two groups of the same bit number (7 bits) within the shift register 200, and arithmetically operated randomly in the logical product circuits and the exclusive OR circuits. Therefore, binary random numbers are uniformed and output by the random number uniforming circuit 1 even though they have a deviation, maintaining a random number generating rate and ensuring safety.

Though in this embodiment the shift register 200 is employed as the random number holding device holding physical random numbers, any other random number holding device (e.g., flip-flop) than the shift register 200 may be employed.

Also, though in this embodiment one random number uniforming circuit 1 is employed to uniform physical random numbers, two or more random number uniforming circuits 100 (CKT1, CKR2, ..., CKTx) as shown in FIGS. 1A and 1B, or FIGS. 2A and 2B may be connected to uniform physical random numbers at multiple stages, as shown in FIGS. 3A and 3B. In this case, a method of connecting the random number uniforming circuits 100 may be the series connection as shown in FIG. 3A, or the parallel connection as shown in FIG. 3B.

As described above, with the present invention, physical random numbers input into the random number holding device (shift register) are uniformed and output even though they have a deviation, in which there is no chance of not outputting random numbers or letting others recognize the deviation of random numbers. Therefore, it is possible to provide the method of uniforming physical random numbers, capable of maintaining a random number generating rate and ensuring safety.

Second Embodiment

Referring to FIGS. 4 to 15, the second embodiment of a physical random number generator according to the present invention will be described below.

Figure 4:
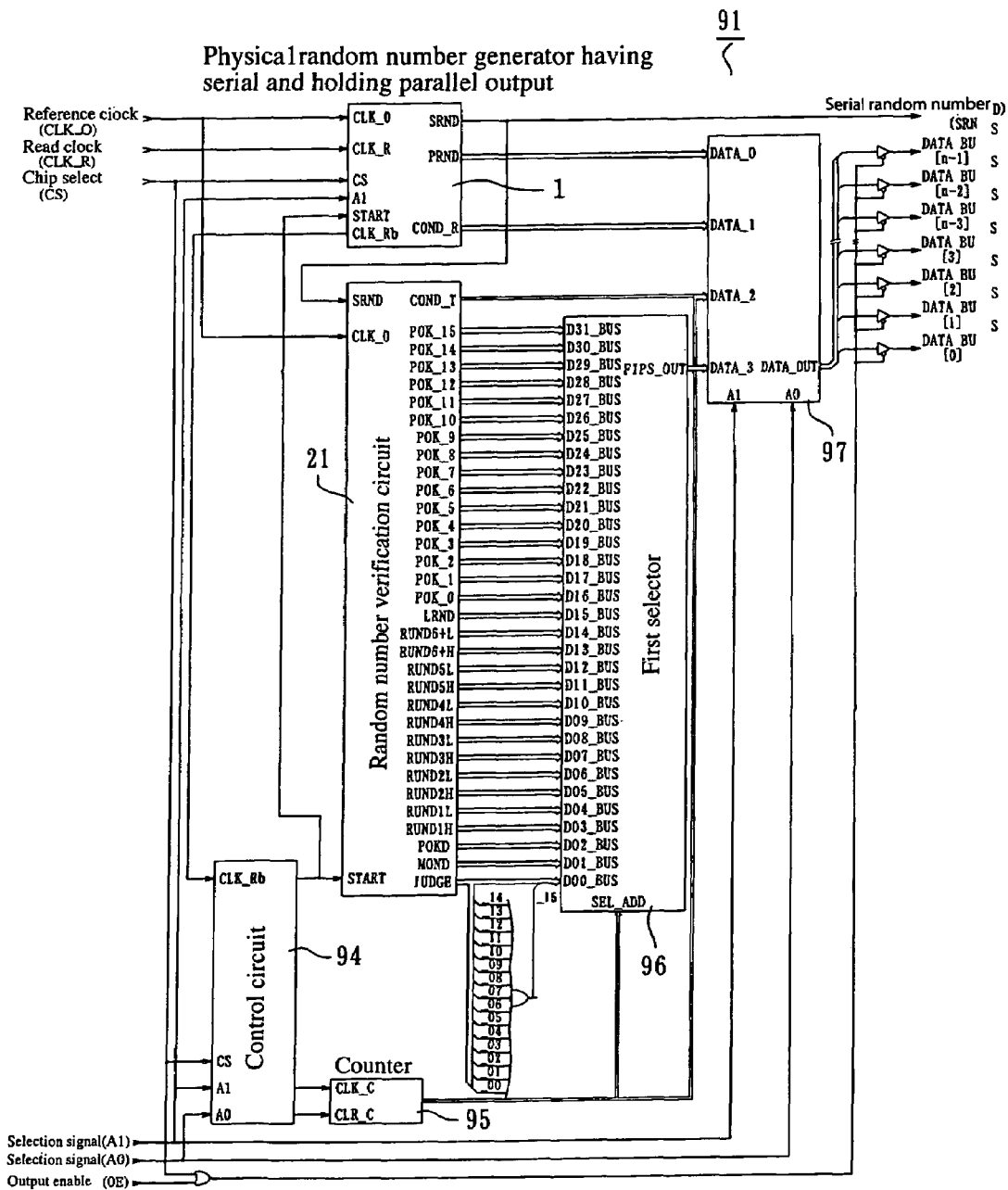
FIG. 4 is a circuit diagram showing a first embodiment of a physical random number generation device according to the present invention.
Figure 5:
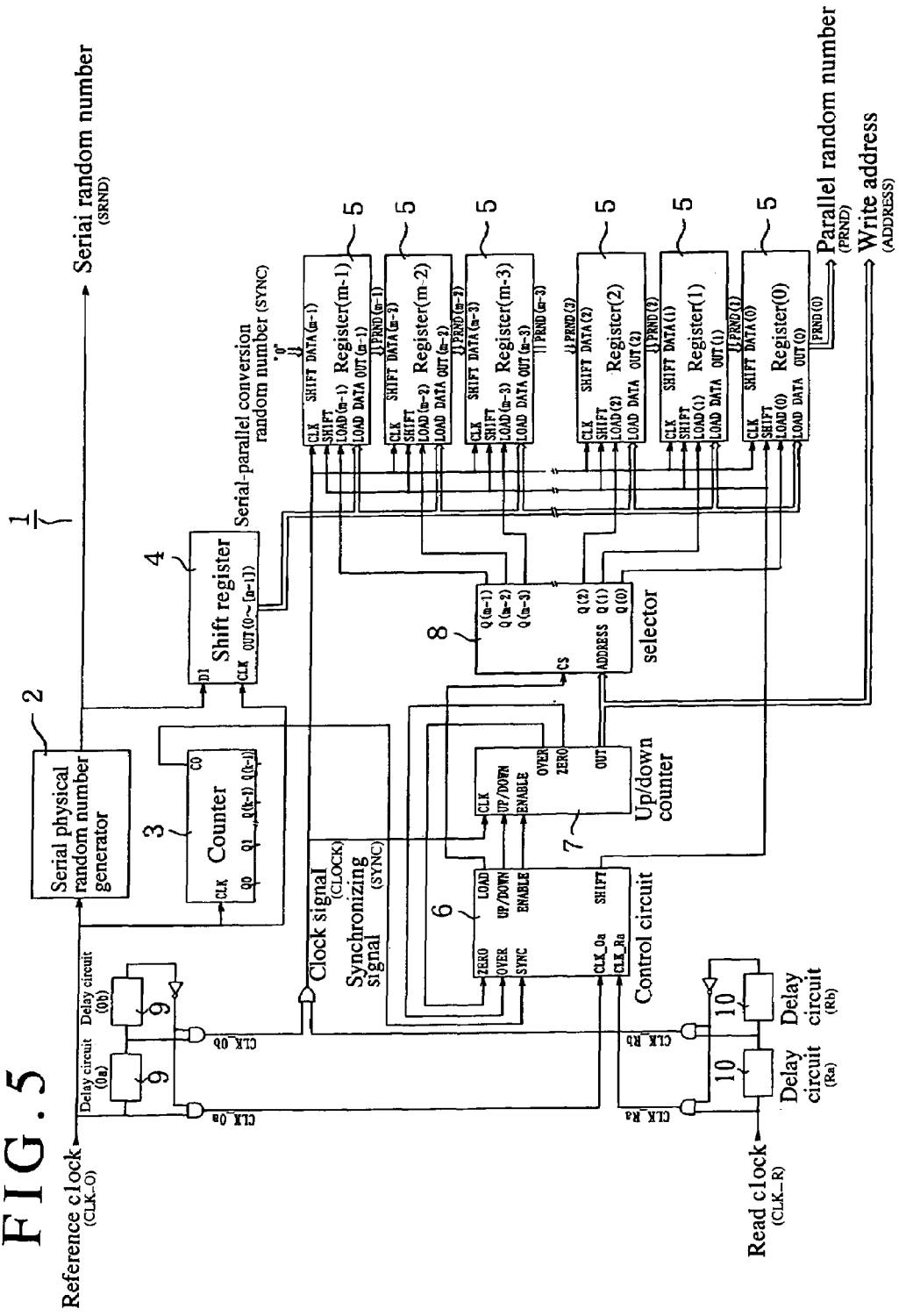
FIG. 5 is a circuit diagram showing the details of a physical random number generator in the physical random number generation device as shown in FIG. 4.
Figure 6:
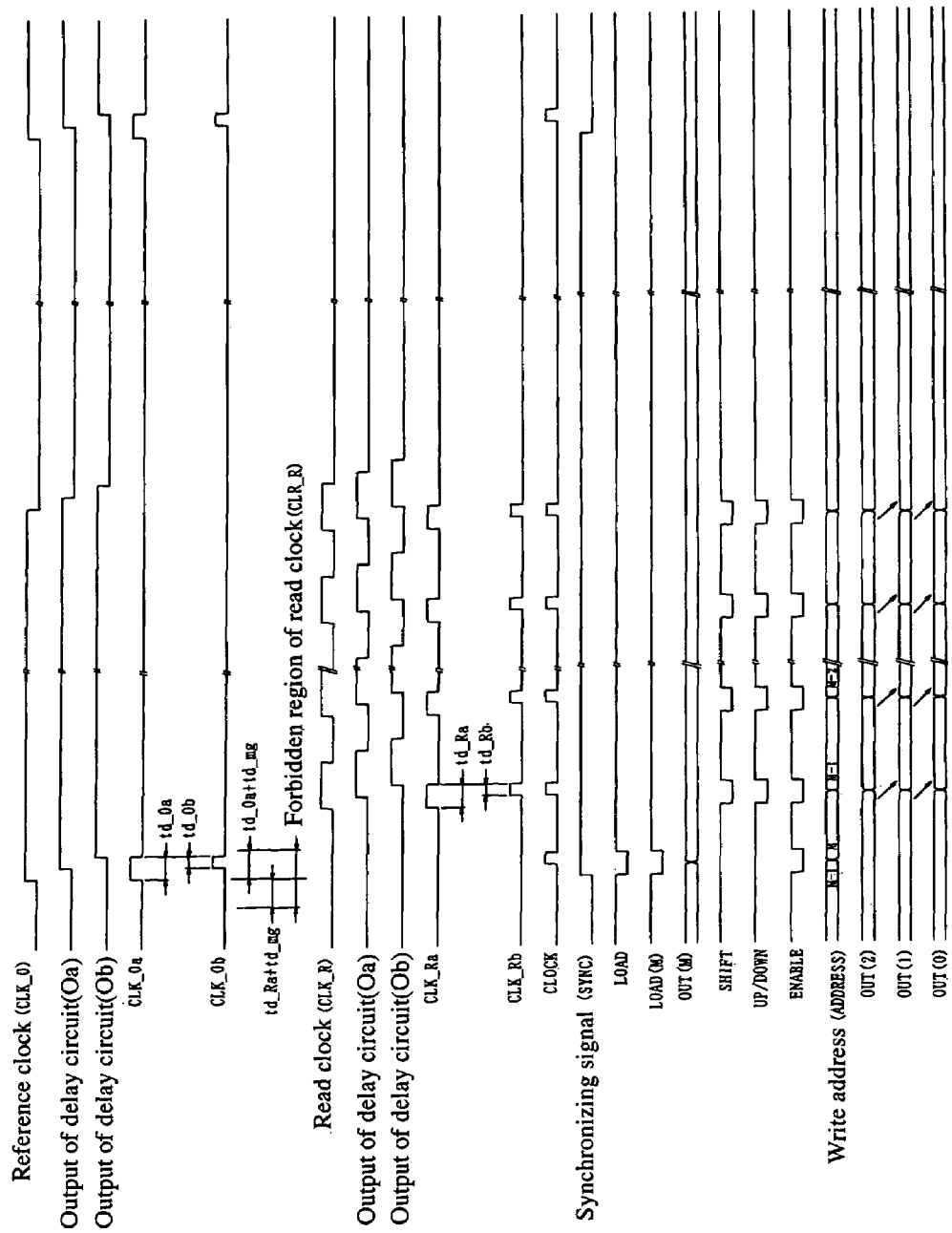
FIG. 6 is a waveform chart showing an output waveform of each section in the physical random number generator as shown in FIG. 5.
Figure 7:
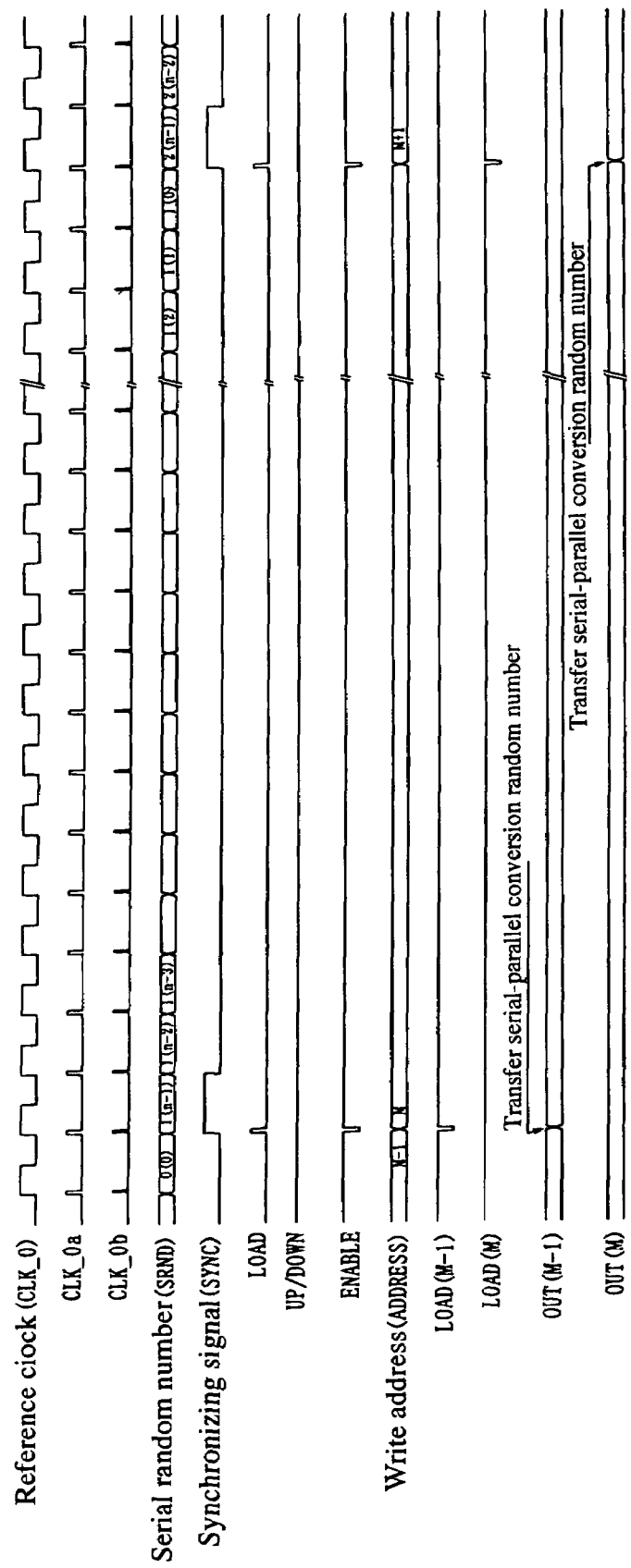
FIG. 7 is a waveform chart showing an output waveform of each section in the physical random number generator as shown in FIG. 5.

This physical random number generation device 91 comprises a physical random number generator 1, a random number verification circuit 21, a control circuit 94, a counter 95, a first selector 96, and a second selector 97, as shown in FIG. 4. The physical random number generator 1 comprises a serial physical random number generator 2, a counter 3, a shift register 4, a plurality of (m in FIG. 5) registers 5, a control circuit 6, an up/down counter 7, a selector 8, two delay circuits 9 on the reference clock side, and two delay circuits 10 on the read clock side, as shown in FIG. 5.

Figure 8:
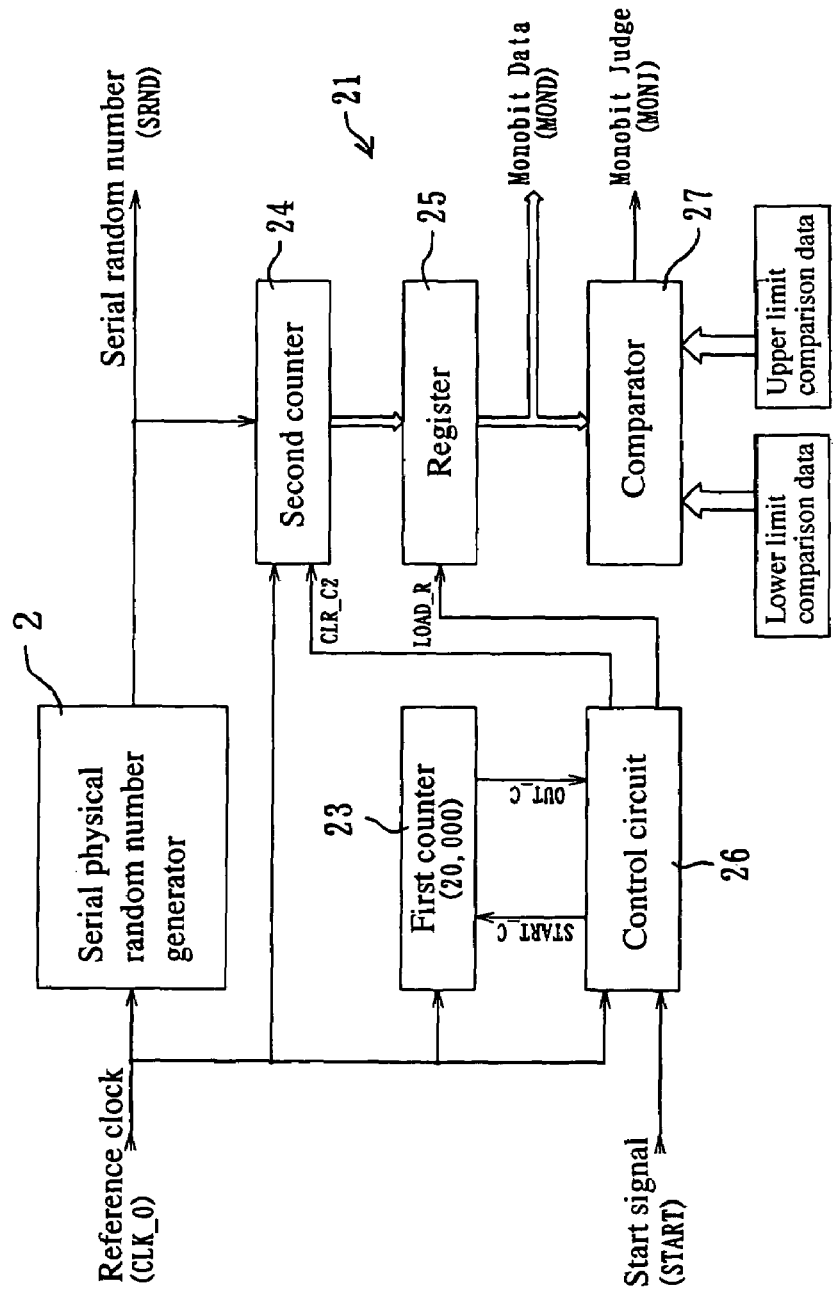
FIG. 8 is a circuit diagram of a part regarding a Monobit Test for a random number verification circuit in the physical random number generation device as shown in FIG. 4.
Figure 9:
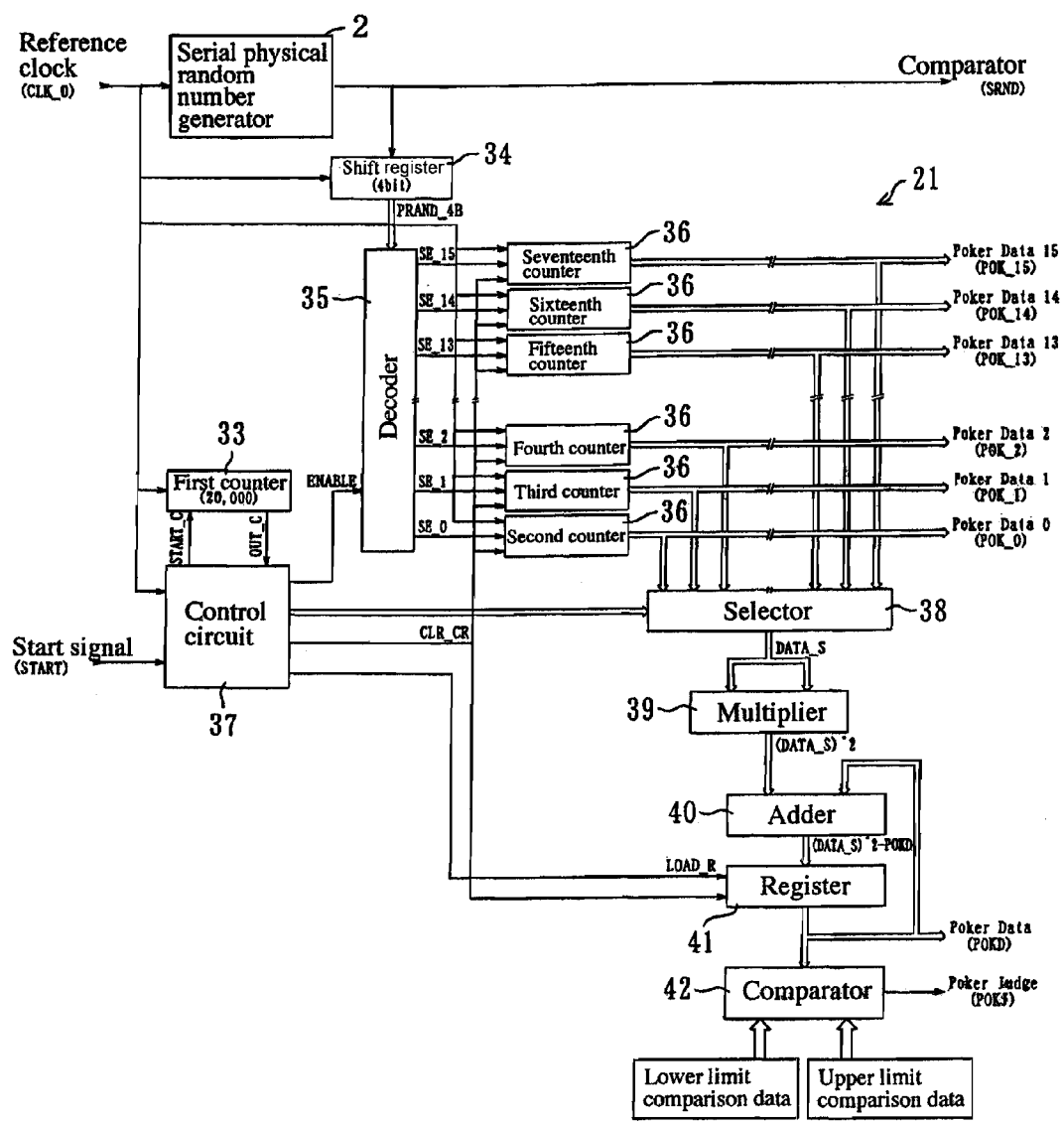
FIG. 9 is a circuit diagram of a part regarding a Poker Test for the random number verification circuit in the physical random number generation device as shown in FIG. 4.
Figure 10:
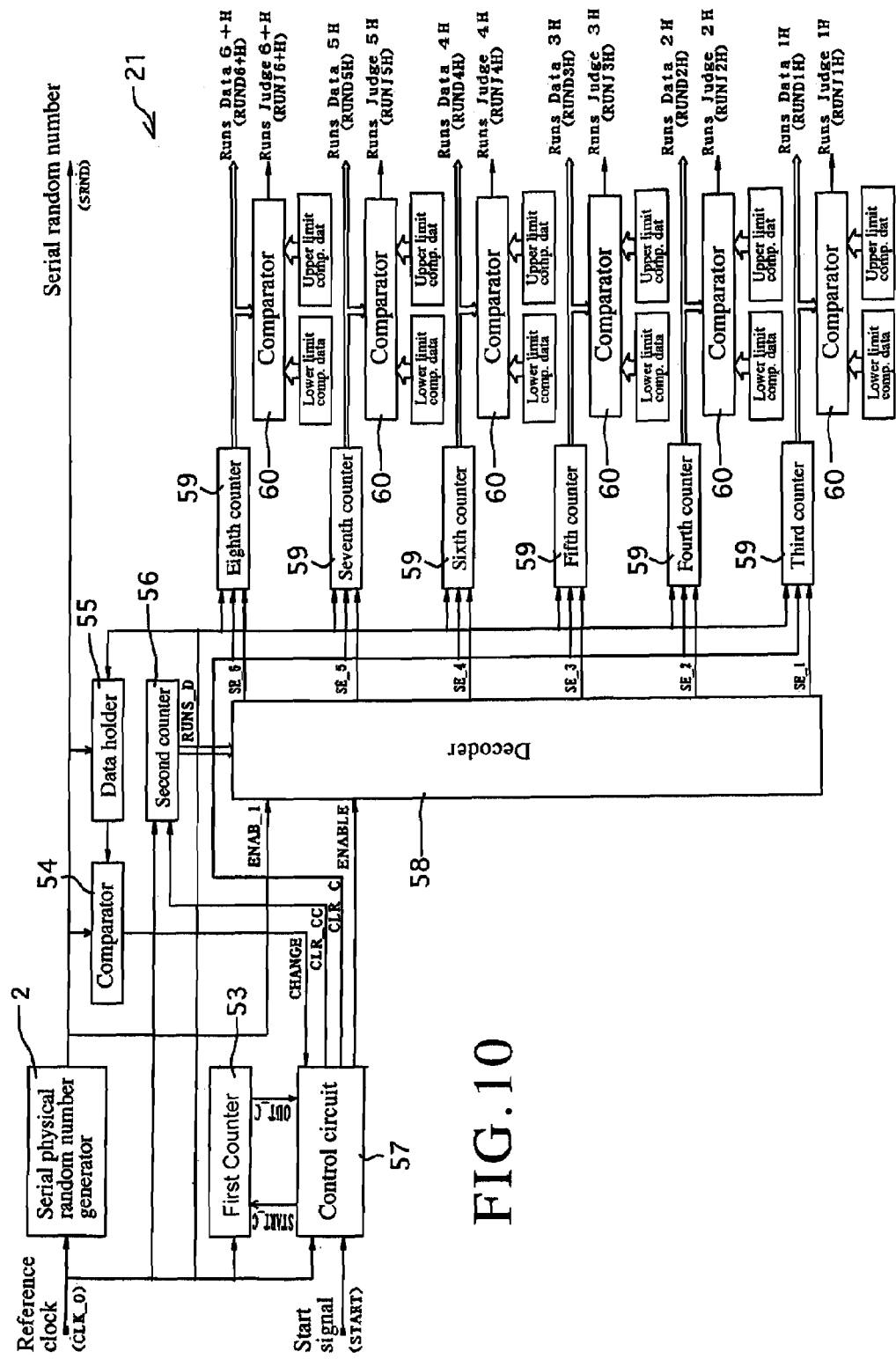
FIG. 10 is a circuit diagram of a part regarding a Runs Test for the random number verification circuit in the physical random number generation device as shown in FIG. 4.
Figure 11:
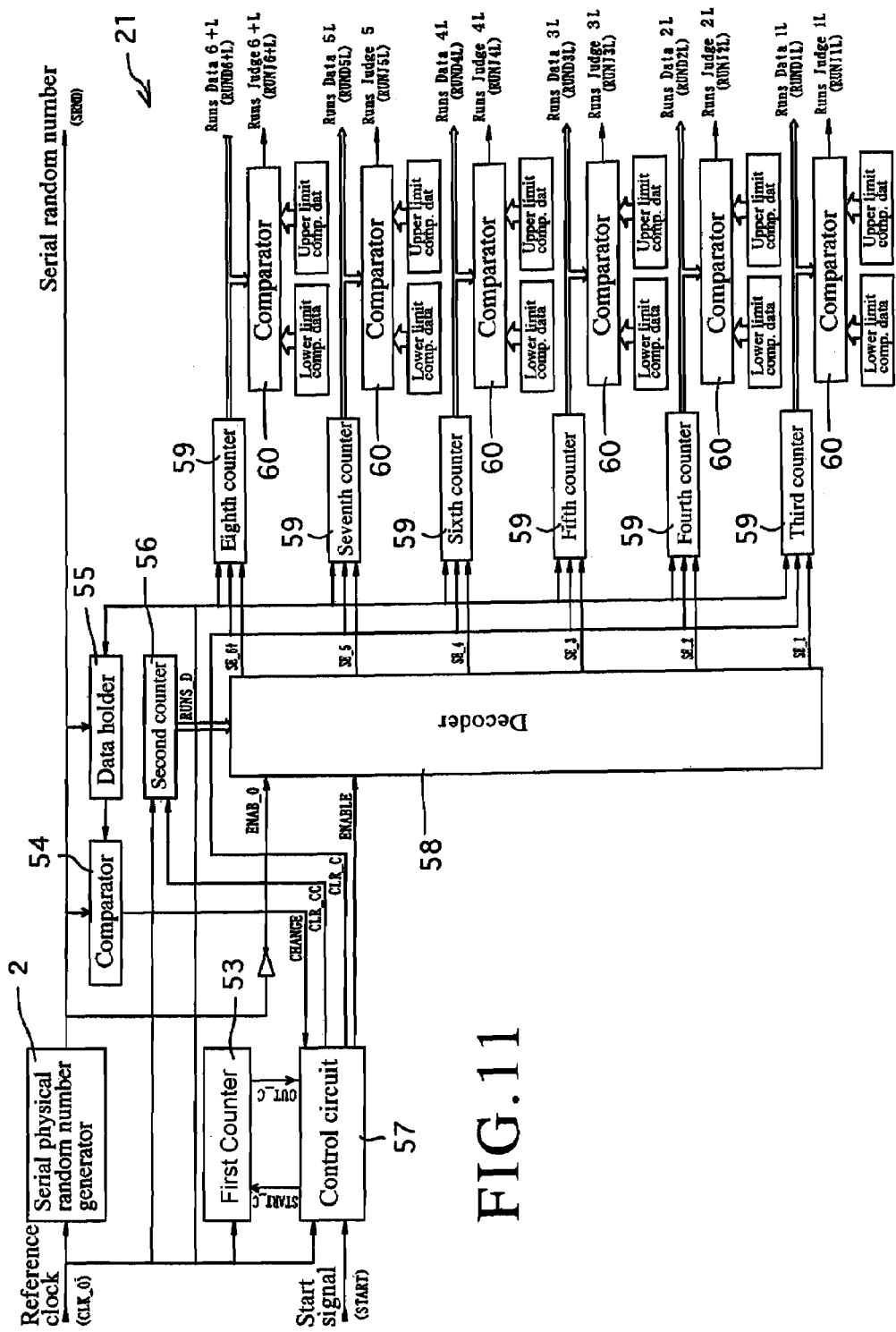
FIG. 11 is a circuit diagram of a part regarding a Runs Test for the random number verification circuit in the physical random number generation device as shown in FIG. 4.
Figure 12:
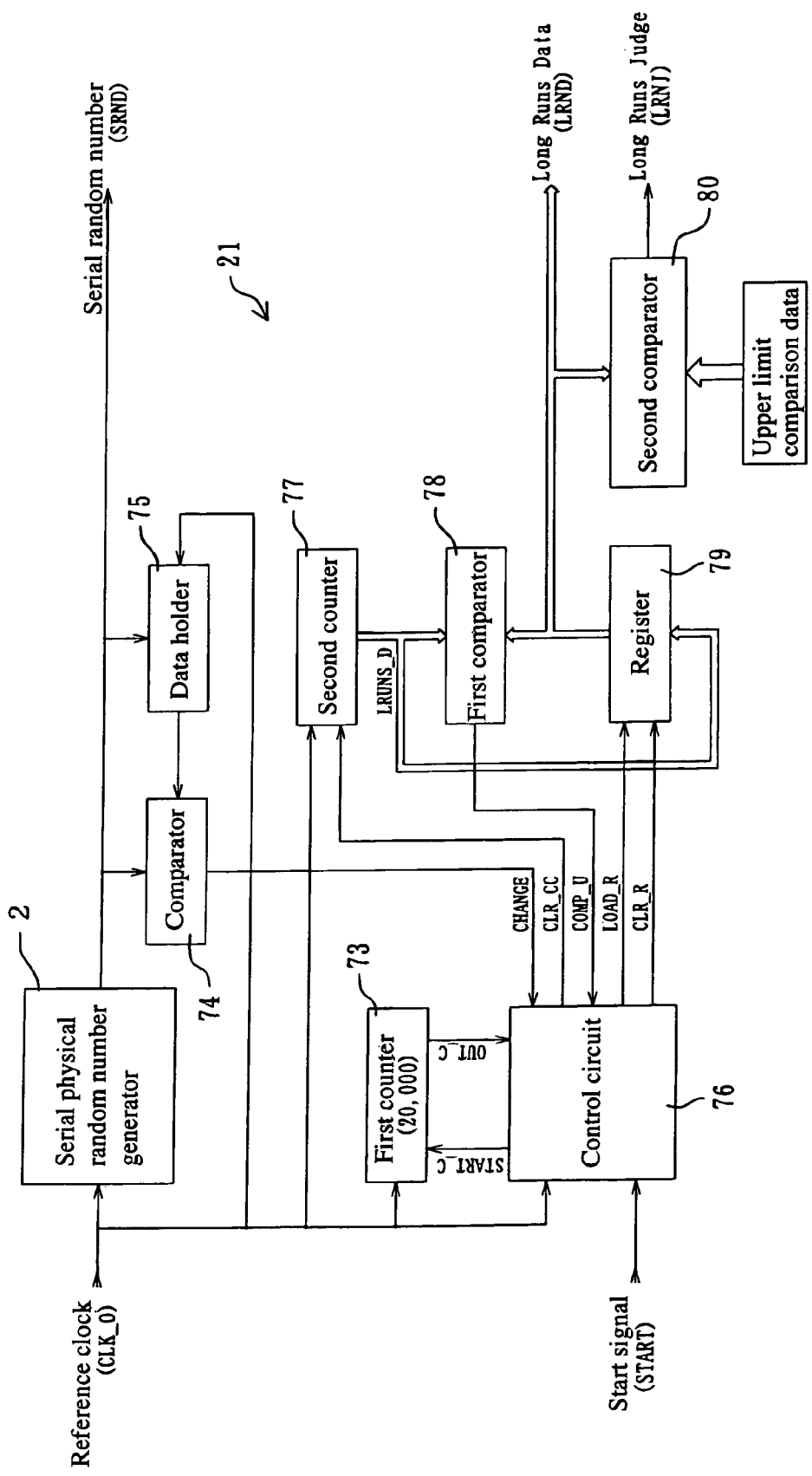
FIG. 12 is a circuit diagram of a part regarding a Long Runs Test for the random number verification circuit in the physical random number generation device as shown in FIG. 4.

On the other hand, the random number verification circuit 21 has parts corresponding to four kinds of testing methods (Monobit Test, Poker Test, Runs Test and Long Runs Test) in conformance with the random number testing standard FIPS 140-2, as shown in FIGS. 8 to 12. That is, a part regarding Monobit Test comprises a first counter 23, a second counter 24, a register 25, a control circuit 26 and a comparator 27, as shown in FIG. 8. A part regarding Poker Test comprises a first counter 33, a shift register 34, a decoder 35, a plurality of (16 in FIG. 9) counters 36, a control circuit 37, a selector 38, a multiplier 39, an adder 40, a register 41 and a comparator 42, as shown in FIG. 9. Also, a part regarding Runs Test is divided into two sections in which the random number outputs are "1" and "0", the former comprising a first counter 53, a comparator 54, a data holder 55, a second counter 56, a control circuit 57, a decoder 58, six counters 59 and six comparators 60, as shown in FIG. 10, and the latter comprising the same configuration as the former, except that an inverter for inverting the output is provided on the output line from the serial physical random number generator 2 of the physical random number generator 1 to the decoder 58, as shown in FIG. 11. Further, apart regarding Long Runs Test comprises a first counter 73, a comparator 74, a data holder 75, a control circuit 76, a second counter 77, a first comparator 78, a register 79 and a second comparator 80, as shown in FIG. 12.

When the physical random number generation device 91 having the above configuration is activated, first of all, serial random numbers are output by the physical random number generator 1, so that the operation turns in a state where the parallel random number is held and output, as needed.

That is, serial random numbers (SRND) generated by the serial physical random number generator 2 at the reference clock (CLK_0) are converted from serial to parallel form in synchronism with the carry out (C0) of the counter 3 by the shift register 4, and the parallel random number (CRND) of n bits is loaded into the register 5 selected by the selector 8 and held.

At this time, the selector 8 selects the register 5 specified by the write address (ADDRESS) output from the up/down counter 7, the parallel random number (CRND) is loaded into the register 5 in synchronism with the carry out (C0) of the counter 3, and the up/down counter 7 counts up every time of loading, and stops to count up and load the parallel random number, when the write address (ADDRESS) output from the up/down counter 7 reaches m, whereafter the operation is kept in this state.

The output (PRND) of the parallel random number is the output from the lowermost register 5, the read clock (CLK_R) is input after reading, the up/down counter 7 counts down and the data within all the registers 5 are shifted from the upper to lower level with the read clock, and the parallel random number (PRND) is updated every time. When the write address (ADDRESS) output from the up/down counter 7 reaches zero, the up/down counter 7 stops to count down and shift the data, whereafter the operation is kept in this state.

The write address (ADDRESS) output from the up/down counter 7 is output to the outside, monitoring the number of parallel random numbers held in all the registers 5 in succession.

The delay circuits 9, 10 take out the edge (e.g., rising edge) of each clock, generate a very short pulse waveform (e.g., 10 ns), and generate the clock signal for the up/down counter 7 and all the registers 5, the ENABLE signal of the up/down counter 7, the SHIFT signal for all the registers 5 and LOAD (0) to Load(m−1). Thereby, when the reference clock (CLK_0) and the read clock (CLK_R) operate a synchronously or synchronously, the interference between the reference clock (CLK_0) and the read clock (CLK_R) is minimized by making a forbidden region (td_Ra+td_0a+2× td_mg) of the edge (e.g., rising edge) of the read clock (CLK_R) to the edge (e.g., rising edge) of the reference clock (CLK_0) very small. CLK_0b and CLK_Rb generate the clock signal (CLOCK) and CLK_0a and CLK_Ra generate the ENABLE signal, SHIFT signal and Load(0) to Load(m−1).

The control circuit 6 generates the UP/DOWN signal and ENABLE signal of the up/down counter 7, the SHIFT signal for all the registers 5, and the LOAD signal for LOAD(0) to LOAD (m−1) from the synchronizing signal (SYNC) of the carry out (C0) of the counter 3, CLK_0a, CLK_Ra, and the OVER signal and ZERO signal of the up/down counter 7.

In this way, a maximum of m parallel random numbers of n bits can be held at the period of n times that of the serial random numbers generated in synchronism with the reference clock by the serial physical random number generator 2. The following serial random numbers are not held until the reading operation (input of CLK_R) is performed. The maximum of m parallel random numbers held in this way can be read in a short time by the required amount (m at maximum) at the read clock, when needed, whereby the read amount of parallel random number is successively filled up. Because the forbidden region of the edge of the read clock to the edge of the reference clock (CLK_0) is very narrow, the parallel random number can be read asynchronously or synchronously at excellent timing and efficiently. By reading the write address, the amount of parallel random numbers held at that time can be checked to make the effective use of random numbers.

Incidentally, the uniformity of serial random numbers generated by the serial physical random number generator 2 is verified by four kinds of testing methods (Monobit Test, Poker Test, Runs Test and Long Runs Test) in conformance with the random number testing standard FIPS 140-2.

First of all, the testing by Monobit Test is made. That is, the first counter 23 starts to count with the signal START_C generated, via the control circuit 26 by the start signal (START) and the reference clock (CLK_0), and outputs the signal OUT_C at the time of 20,000 counts, as shown in FIG. 8. The second counter 24 makes the initialization with the output signal CLR_C2 of the control circuit 26, when the start signal (START) is entered, and counts "1" or "0" of the serial random number (SRND). The register 25 loads and holds the count value of the second counter 24 with the output signal LOAD_R of the control circuit 26 at the time of 20,000 counts since the start signal (START) is entered, and outputs MonobitData (MOND). The comparator 27 compares the output MonobitData (MOND) of the register 25 with the upper limit comparison data (e.g., 10,275 bit) and the lower limit comparison data (e.g., 9,725 bit), and outputs the MonobitJudge (MONJ) signal. Thereby, for serial random numbers generated in synchronism with the reference clock, MonobitData and MonobitJudge can be verified at the time of 20,000 clocks after the start signal.

Next, the testing by Poker Test is made. That is, the first counter 33 starts to count with the signal START_C generated via the control circuit 37 by the start signal (START) and the reference clock (CLK_0), and outputs the signal OUT_C at the time of 20,000 counts, as shown in FIG. 9. The shift register 34 converts serial random numbers (SRND) into the parallel random number (PRAND_4B) of 4 bits successively at the reference clock (CLK_0). The decoder 35 outputs the parallel random number to the output sections (SE_0 to SE_15) specified by the parallel random number (PRAND_4B), when the ENABLE signal generated via the control signal 37 by the start signal (START) and the reference clock (CLK_0) is active (once for every four clocks). The counter 36 makes the initialization with the output signal CLR_CR of the control circuit 37, when the start signal (START) is entered, and when the ENABLE signal is active (once for every four clocks), the counter 36 specified by the decoder 35 counts up with the data of parallel random number (PRAND_4B). A sum of all the counters 36 amounts to 5,000 counts, and for serial random numbers generated in synchronism with the reference clock, the frequency distribution data (PokerData0 to PokerData15) for data (0 to 15) of the parallel random number (PRAND_4B) for every four bits is acquired at the time of 20,000 clocks after the start signal. The register 41 makes the initialization (POKD=0) with the output signal CLR_CR of the control circuit 37, when the start signal (START) is entered. After acquiring the frequency distribution data (PokerData0 to PokerData15), PokerData (POKD) is acquired by calculating a sum of squares of 16 frequency distribution data (PokerData0 to PokerData15) via the selector 38, the multiplier 39, and the adder 40. The comparator 42 compares the output PokerData (POKD) of the register 41 with the upper limit comparison data (e.g., 1,576, 928 bit) and the lower limit comparison data (e.g., 1,563,175 bit), and outputs the PokerJudge (POKJ) signal. Thereby, for serial random numbers generated in synchronism with the reference clock, PokerData and PokerJudge can be verified at the time of 20,000+16 clocks after the start signal.

Next, the testing by Runs Test is made. That is, the first counter 53 starts to count with the signal START_C generated via the control circuit 57 by the start signal (START) and the reference clock (CLK_0), and outputs the signal OUT_C at the time of 20,000 counts, as shown in FIGS. 10 and 11. The data holder 55 holds one bit of serial random number (SRND) successively at the reference clock (CLK_0). The comparator 54 compares the serial random number (SRND) with the random number held in the data holder 55, and outputs the signal CHANGE when the current random number is changed from the random number before one clock. The second counter 56 counts the clocks from the time when the signal CHANGE is output to the time when it is next output, and outputs the signal RUNS_D. The relationship between the signal RUNS_D and the length (L) of the same signal is $L=RUNS\_D+1$. The second counter 56 makes the initialization (RUNS_D=0) with the output signal CRL_CC of the control circuit 57, when the start signal (START) is entered and when the signal CHANGE is output. The decoder 58 makes the output (SE_1 to SE_6+) selected by the output (RUNS_D) of the second counter 56 active, when the ENABLE signal generated via the control signal 57 by the output (OUT_C) of the first counter 53 and the output (CHANGE) of the comparator 54 is active (CHANGE is active), and when the serial random number (SRND) is "1" in FIG. 10, or when the serial random number (SRND) is "0" in FIG. 11. It follows that L=1→SE_1, L=2→SE_2, . . . , and L=6+→SE_6+. All of counters 59 make the initialization with the output signal CLR_C of the control circuit 57, when the start signal (START) is entered. The counter 59 specified by the output (SE_1 to SE_6+) of the decoder 58 counts up, and the appearance number (RunsData1H to RunsData6+H in FIG. 10, or RunsData1L to RunsData6+L in FIG. 11) having the length (L) of the same signal for 1 to 6+ is acquired. Each comparator 60 compares the output (RunsData1H to RunsData6+H in FIG. 10, or RunsData1L to RunsData6+L in FIG. 11) of each counter 59 with the upper limit comparison data (e.g., 2,685, 1,386,723,384,209,209) and the lower limit comparison data (e.g., 2,315, 1,114,527,240,103,103) and outputs a determination signal (RunsJudge1H to RunsJudge6+H in FIG. 10, or RunsJudge1L to RunsJudge6+L in FIG. 11). Thereby, for serial random numbers generated in synchronism with the reference clock, the data of Runs Test and the determination can be verified at the time of 20,000 clocks after the start signal.

Finally, the testing by Long Runs Test is made. That is, the first counter 73 starts to count with the signal START_C generated via the control circuit 76 by the start signal (START) and the reference clock (CLK_0), and outputs the signal OUT_C at the time of 20,000 counts, as shown in FIG. 12. The data holder 75 holds one bit of serial random number (SRND) successively at the reference clock (CLK_0). The comparator 74 compares the serial random number (SRND) with the random number held in the data holder 75, and outputs the signal CHANGE when the current random number is changed from the random number before one clock. The second counter 77 counts the clocks from the time when the signal CHANGE is output to the time when it is next output, and outputs the signal LRUNS_D. The second counter 77 makes the initialization (LRUNS_D=0) with the output signal CRL_CC of the control circuit 76, when the start signal (START) is entered and when the signal CHANGE is output. The register 79 makes the initialization (LRUNS_D=0) with the output signal CLR_R of the control circuit 76, when the start signal (START) is entered. The first comparator 78 compares the output signal LongRunsData (LRND) of the register 79 with the output signal (LRUNS_D) of the second counter 77, and outputs the output signal COMP_U when LRND<LRUNS_D, outputs the LOAD_R signal via the control circuit 76 to the register 79, and successively holds the maximum value of LRUNS_D in the register 79. The second comparator 80 compares data with the upper limit comparison data (e.g., 26), and outputs a determination signal Long RunsJudge (LRNJ). The relationship between the signal LRUNS_D and the length (L) of the same signal as LRND is $L=LRUNS\_D+1$, $L(max)=LRND+1=LRUNS\_D(max)+1$. Thereby, for serial random numbers generated in synchronism with the reference clock, the data of LongRunsTest and the determination can be verified at the time of 20,000 clocks after the start signal.

And the verified data of uniformed random numbers that are verified by the four kinds of testing methods is held in the second selector 97, and output as desired by the user, as shown in FIG. 4. Table 3 is a table listing the selection signals (A0, A1) and the operation.

TABLE 3

| ADDRE_S | A1 | A0 | Operation of read clock (CLK_R) | Output (DATA BUS) |
|---|---|---|---|---|
| 0 | 0 | 0 | Update parallel physical random number | Parallel physical random number |
| 1 | 0 | 1 | Update parallel physical random number | Generated state of parallel physical random number |
| 2 | 1 | 0 | Start of verification for random number/initialization of counter | Verified state of random number/ monitor address |
| 3 | 1 | 1 | Update monitor address for verification of random number | Verified result of random number/ verified data |

That is, the physical random number generator 1 updates (count down of the up/down counter 7) or does not update the parallel random number at the read clock (CLK_R), depending on the state ("0" or "1") of the selection signal (A1). The parallel random number (PRND) of the output is connected to DATA_0 of the second counter 97. The output (COND_R) outputs various kinds of data or flags such as write address (ADDRESS) generated when generating the physical random number or converting the parallel random number, and is connected to DATA_1 of the second selector 97.

The random number verification circuit 21 starts to verify random numbers with the read clock (CLK_R) signal via the control circuit 94, when the selection signal (A0, A1) is 2 (ADDRE_S), completes the testing of MonobitTest, PokerTest, RunsTest and LongRunsTest with the reference clock (CLK_0) in 20,000+16 cycles, outputs the determination result, the determination data, and raw data of PokerTest, and is connected to the first selector 96. Table 4 lists its details.

TABLE 4

| Monitor address (SEL_ADD) | Output (DATA BUS) |
|---|---|
| 0 | 0; Monobit Judge (MONJ) |
|   | 1; Poker Judge(POKJ) |
|   | 2; Runs Judge 1H(RUNJ1H) |
|   | 3; Runs Judge 1L(RUNJ1L) |
|   | 4; Runs Judge 2H(RUNJ2H) |
|   | 5; Runs Judge 2L(RUNJ2L) |
|   | 6; Runs Judge 3H(RUNJ3H) |
|   | 7; Runs Judge 3L(RUNJ3L) |
|   | 8; Runs Judge 4H(RUNJ4H) |
|   | 9; Runs Judge 4L(RUNJ4L) |
|   | 10; Runs Judge 5H(RUNJ5H) |
|   | 11; Runs Judge 5L(RUNJ5L) |
|   | 12; Runs Judge 6+H(RUNJ6+H) |
|   | 13; Runs Judge 6+L(RUNJ6+L) |
|   | 14; Long Run Judge(LRNJ) |
|   | 15; Comprehensive determination |
| 1 | Monobit Data(MOND) |
| 2 | Poker Data(POKD) |
| 3 | Runs Data 1H(RUND1H) |
| 4 | Runs Data 1L(RUND1L) |
| 5 | Runs Data 2H(RUND2H) |
| 6 | Runs Data 2L(RUND2L) |
| 7 | Runs Data 3H(RUND3H) |
| 8 | Runs Data 3L(RUND3L) |
| 9 | Runs Data 4H(RUND4H) |
| 10 | Runs Data 4L(RUND4L) |
| 11 | Runs Data 5H(RUND5H) |
| 12 | Runs Data 5L(RUND5L) |
| 13 | Runs Data 6+H(RUND6+H) |
| 14 | Runs Data 6+L(RUND6+L) |
| 15 | Long Run Data(LRND) |
| 16 | Poker Data 0 (POK_0) |
| 17 | Poker Data 1 (POK_1) |
| 18 | Poker Data 2 (POK_2) |
| 19 | Poker Data 3 (POK_3) |
| 20 | Poker Data 4 (POK_4) |
| 21 | Poker Data 5 (POK_5) |
| 22 | Poker Data 6 (POK_6) |
| 23 | Poker Data 7 (POK_7) |
| 24 | Poker Data 8 (POK_8) |
| 25 | Poker Data 9 (POK_9) |
| 26 | Poker Data 10 (POK_10) |
| 27 | Poker Data 11 (POK_11) |
| 28 | Poker Data 12 (POK_12) |
| 29 | Poker Data 13 (POK_13) |
| 30 | Poker Data 14 (POK_14) |
| 31 | Poker Data 15 (POK_15) |

The comprehensive determination is output when all the determination results are successful. The output (COND_T) outputs various kinds of data or flags generated when verifying the random numbers, and is connected to DATA 2 of the second selector 97, along with the monitor address (SEL_ADD) of the counter output. Also, the counter 3, the shift register 4, the up/down counter 7 and all the registers 5 for generating the parallel random number are initialized with the start signal for verification, and the verified physical random number is held and utilized.

The counter 95 generates the monitor address (SEL_ADD) of the first selector 96. The counter 95 starts the verification with the read clock (CLK_R) signal when the selection signal (A0, A1) is 2 (ADDRE_S) in the output signal (CLR_C) of the control circuit 94, makes the initialization at this start time, and counts up (is updated) with the read clock (CLK_R) signal when the selection signal (A0, A1) is 3 (ADDRE_S) in the output signal (CLK_C) of the control circuit 94.

Thereby, it is possible to successively perform the verification for uniformity of serial random numbers (SRND) generated in synchronism with the reference clock and the parallel random numbers (PRND) filled up successively.

In this way, the verification for the physical random number generator 1 and the check for data are facilitated, and the random numbers after verification can be utilized. Employing the selection signal (A0, A1) and the second selector 97, the input/output terminals are greatly reduced. The effective verification data for reference can be expanded by the selection signal (A0, A1), the read clock (CLK_R), the counter 95 and the second selector 97.

Figure 13:
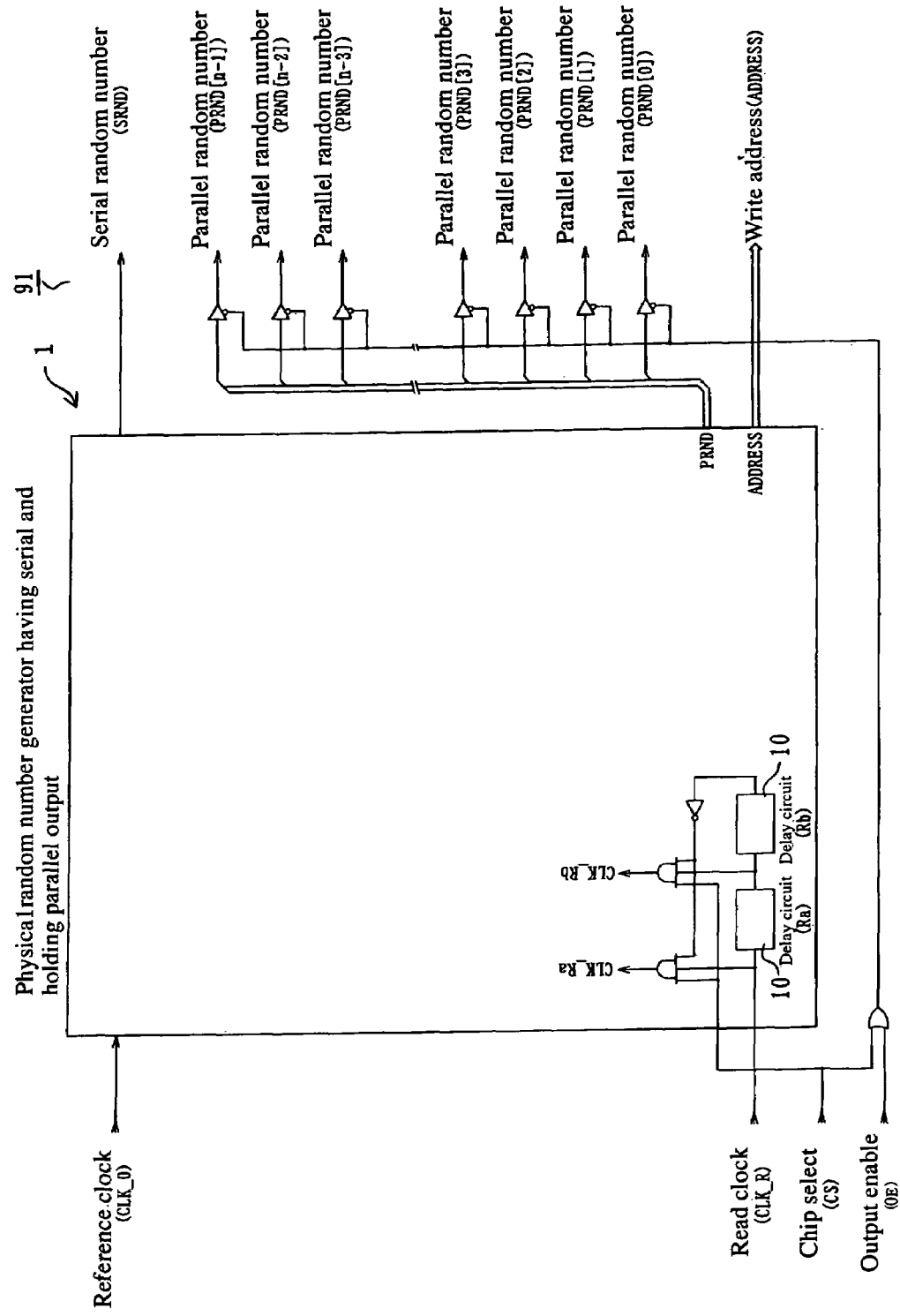
FIG. 13 is a circuit diagram showing a second embodiment of the physical random number generation device according to the present invention.

The physical random number generator 1 may be additionally provided with the inputs of the chip select (CS) and the output enable (0E) to have the output form of parallel random numbers [PRND(0) to PRND(n−1)] in three states ("0", "1", off), as shown in FIG. 13.

Figure 14:
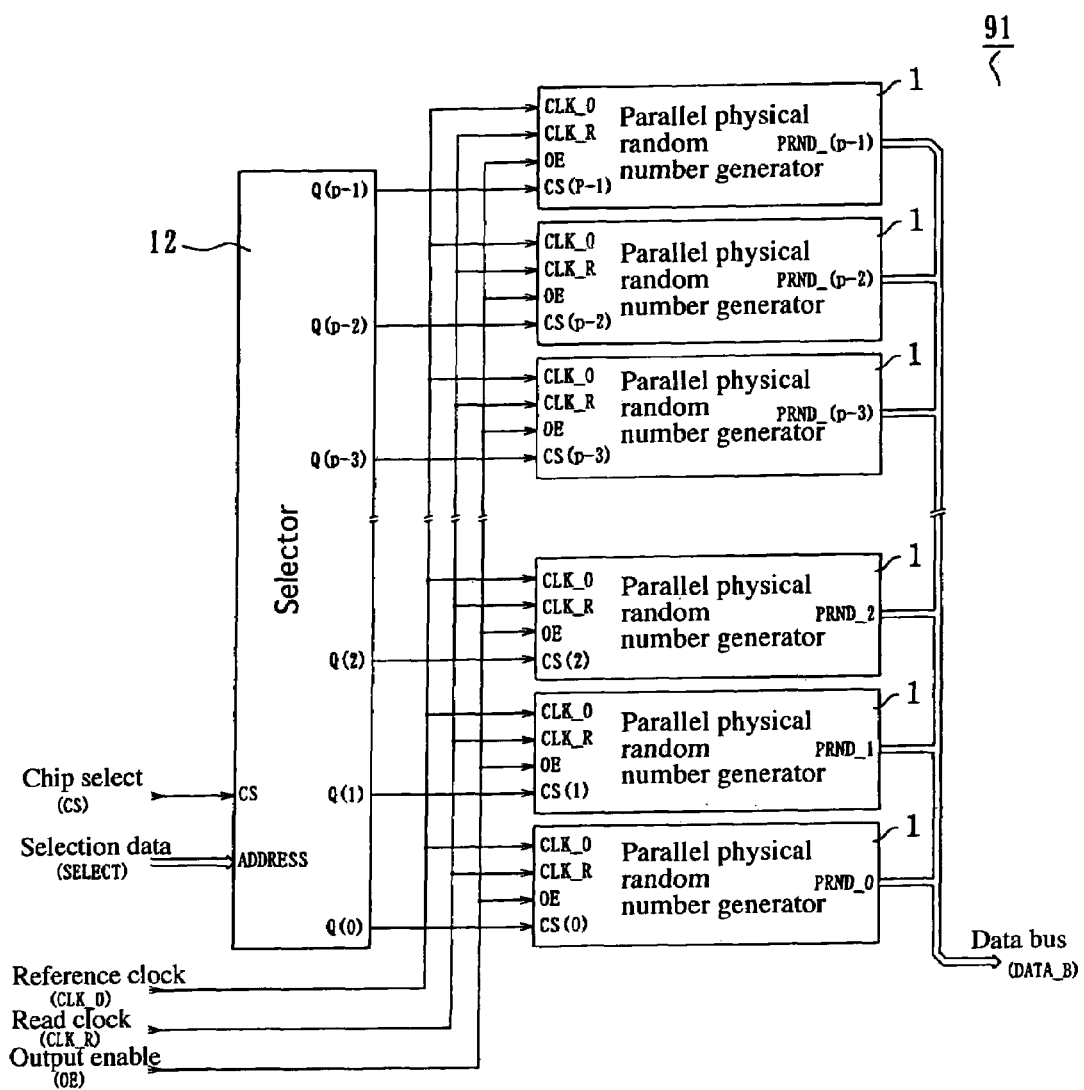
FIG. 14 is a circuit diagram showing a third embodiment of the physical random number generation device according to the present invention.
Figure 15:
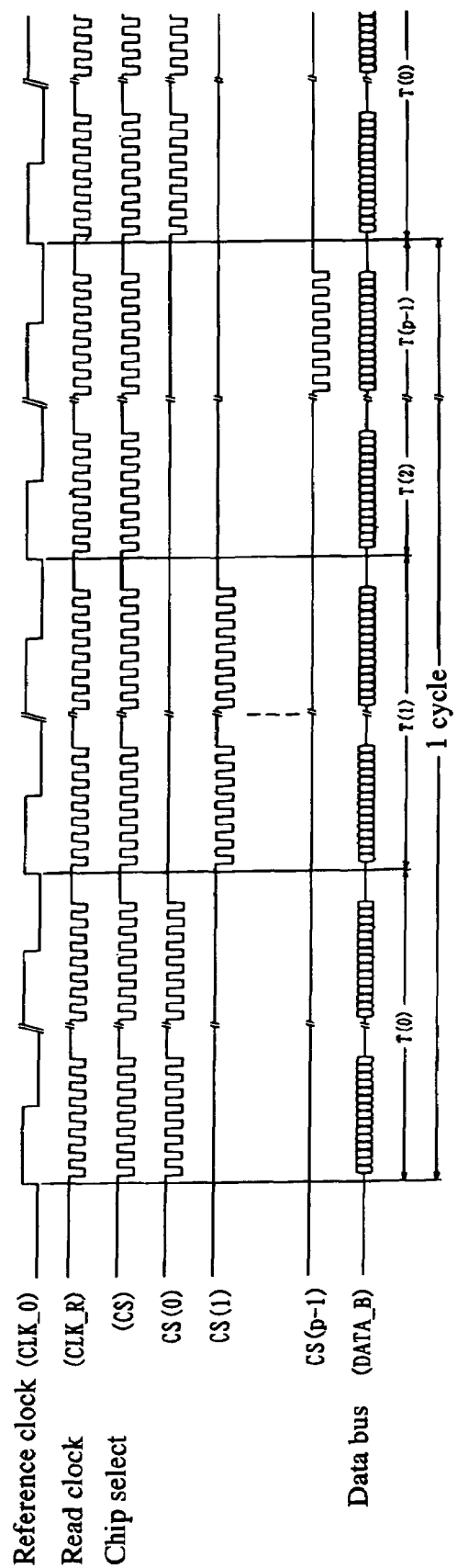
FIG. 15 is a waveform chart showing an output waveform of each section in the physical random number generation device as shown in FIG. 14.

Also, the fast (p times in FIG. 14) random number generation speed can be achieved by employing a plurality of (p in FIG. 14) physical random number generators 1 and the selector 12, as shown in FIGS. 14 and 15. Herein, providing that the forbidden region (td_Ra+td_0a+2×td_mg) of the edge (e.g., rising edge) of the read clock (CLK_R) to the edge (e.g., rising edge) of the reference clock (CLK_0) is very small, it is possible to easily realize the asynchronous or synchronous fast random number generation.

In this way, a plurality of physical random number generators 1 are easily connected by having the chip select (CS) and the output enable (0E), making the random number generation faster. Also, the physical random number generators 1 are easily connected to the system using the CPU by having the chip select (CS) and the output enable (0E).

Though in the above embodiment, two delay circuits 9, are provided on the reference clock side and the read clock side to minimize the interference between the reference clock (CLK_0) and the read clock (CLK_R) by making the forbidden region (td_Ra+td_0a+2×td_mg) of the edge of the read clock (CLK_R) to the edge of the reference clock (CLK_0) very small, the delay circuits 9, 10 may be provided on any one of the reference clock side and the read clock side, and one or more delay circuits 9, 10 may be provided. Or instead of the delay circuits 9, 10, a waveform shaping circuit (e.g., monostable multivibrator) may be additionally provided to attain the same effect.

As described above, with the second embodiment of the invention, the generated physical random numbers can be utilized efficiently, and the uniformity of random numbers easily tested, with a simple circuit configuration.

Also, with the second embodiment of the invention the random numbers can be generated at high rate, employing a plurality of physical random number generation ICs, and directly connected to Data Bus, whereby the physical random number generation device is remarkably easier to employ.

Third Embodiment

Figure 16:
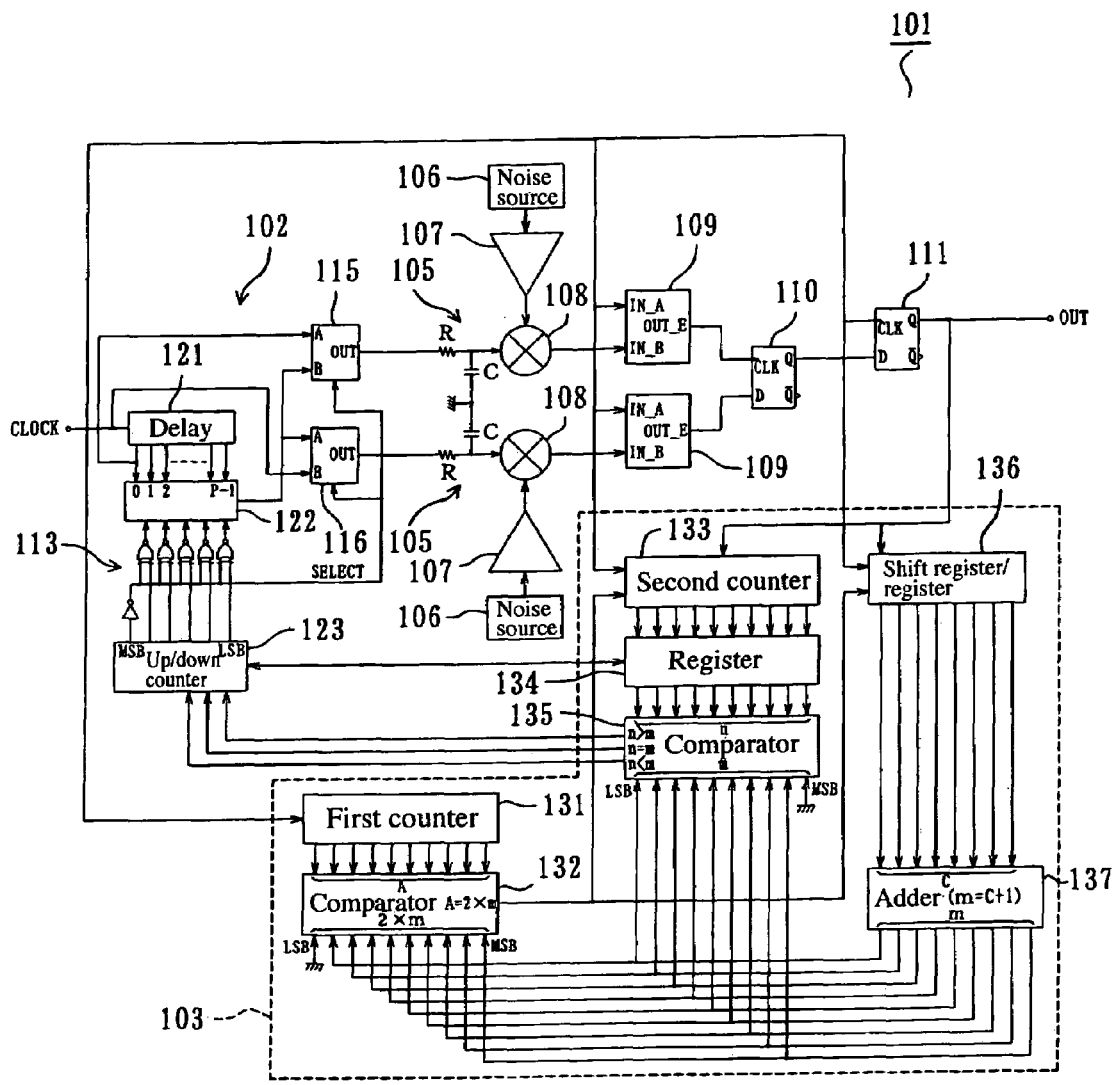
FIG. 16 is a circuit diagram showing one form of the physical random number generator according to the present invention.
Figure 17:
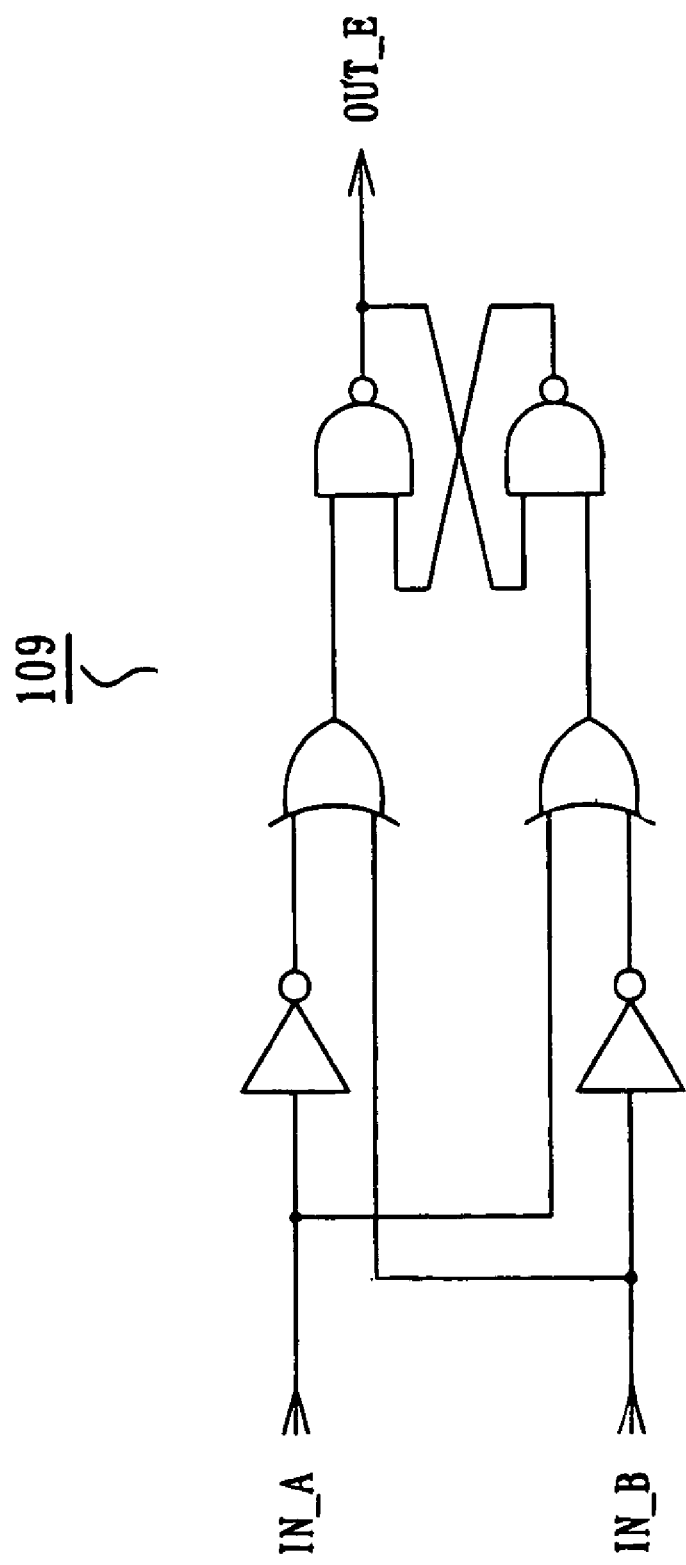
FIG. 17 is a diagram showing the details of an edge detection circuit in the physical random number generator as shown in FIG. 16.
Figure 18:
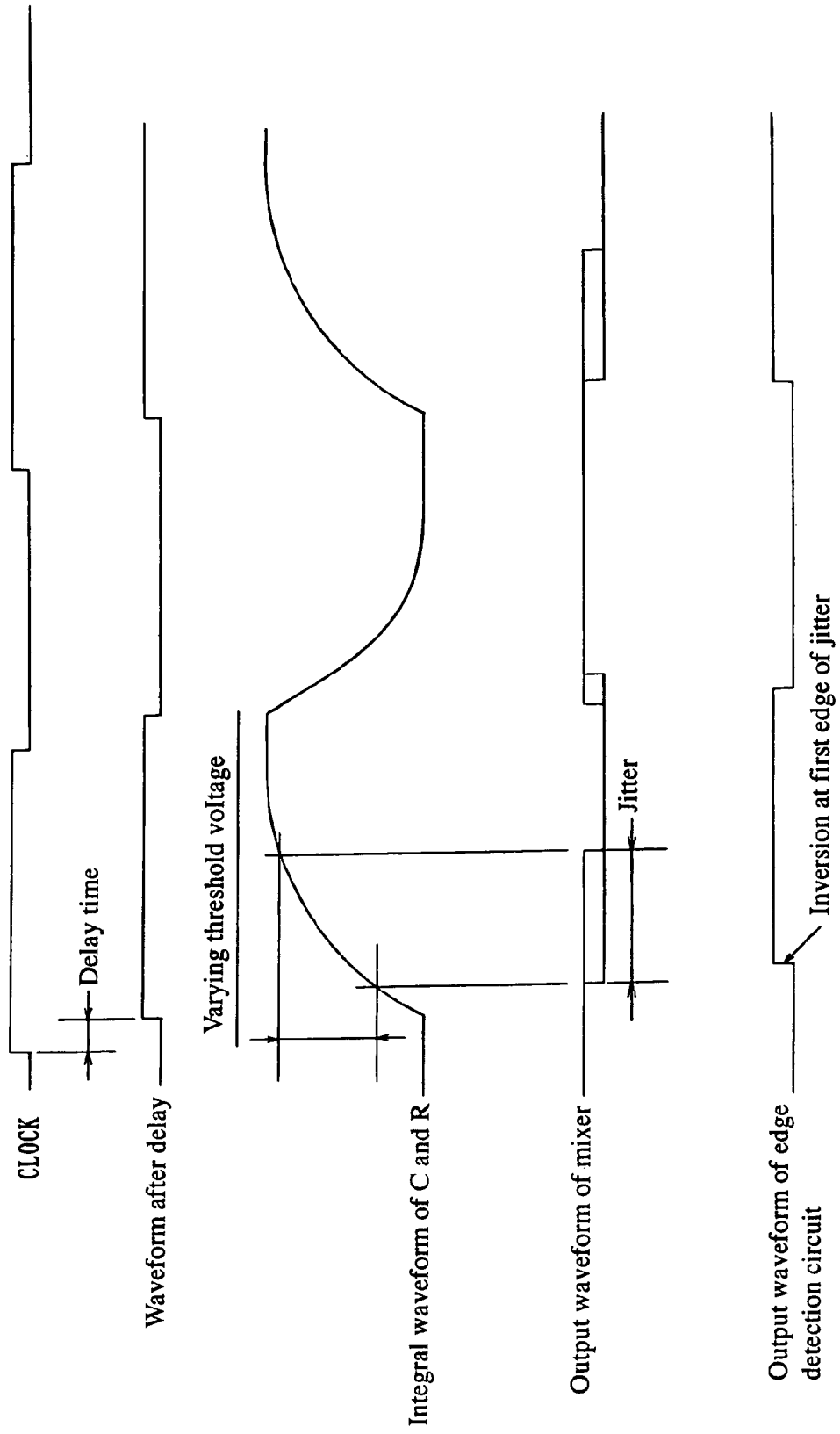
FIG. 18 is a chart showing the operation waveforms of the physical random number generator as shown in FIG. 16.

In a third embodiment of the present invention, the physical random number generator comprises two integration circuits 105 for integrating the clock signal through a resistor R and a capacitor (condenser) C to output an integral waveform, two noise sources 106, two amplifiers 107 for amplifying the noise of the noise source 106 to output a noise signal, two mixers 108 for mixing the integral waveform and the noise signal, and two edge detection circuits 109 for detecting the first edge of jitter generated based on an output waveform of the mixer 108, as shown in FIGS. 16 and 18. Each edge detection circuit 109 has a circuit configuration, as shown in FIG. 17. A D-type flip-flop 110 for outputting "0" or "1" based on a phase difference in the output signal between each edge detection circuit 109 is provided at the latter stage of the edge detection circuit 109, as shown in FIG. 16. Furthermore, a D-type flip-flop 111 for synchronizing the random numbers with the clock signal is provided at the latter stage of the flip-flop 110.

At the foremost stage of the physical random number generator 101, a phase adjuster 102 for adjusting the phase of an input signal input into each integration circuit 105 is provided. This phase adjuster 102 comprises a delay 121, a first selector 122 and an up/down counter 123.

Also, a feedback circuit 103 is provided between the output of the flip-flop 111 and the up/down counter 123, and feeds back the output of the flip-flop 111 to the phase adjuster 102 so that "0" or "1" output from the flip-flop 111 may converge to 50%. That is, the feedback circuit 103 comprises a first counter 131, a comparator 132, a second counter 133, a register 134, a comparator 135, a shift register/register 136, and an adder 137, in which the first counter 131 and the comparator 132 generate the period of feedback with random numbers (2×m). Also, the second counter 133, the register 134 and the comparator 135 count (n) "0" or "1" in the random numbers (2×m) for the period of feedback, output the comparison data to the up/down counter 123, and output a feedback signal for correcting the uniformity of random numbers. Furthermore, the shift register/register 136 and the adder 137 acquire the random numbers (m) deciding the period of feedback from the output (OUT). Thereby, it is possible to prevent degradation in the quality (habit) of random numbers due to the period of feedback.

Moreover, a second selector 115 and a third selector 116 are provided between the phase adjuster 102 and each integration circuit 105, and a polarity switching circuit 113 is provided between the first selector 122 and the up/down counter 123 to switch the polarity of input for the first selector 122, the second selector 115 and the third selector 116 by the most significant bit MSB of the up/down counter 123, as listed in Table 5.

TABLE 5

| Up/down counter | SELECT | Address of first selector | Output of second selector | Output of third selector | Relative time difference |
|---|---|---|---|---|---|
| 1Fh | | 1Fh | 0(A) | P − 1(A) | P |
| 1Eh | | 1Eh | 0(A) | P − 2(A) | P − 1 |
| | | | | | |
| | 1 | | | | |
| | | | | | |
| | | | | | |
| 02h | | 02h | 0(A) | 2(A) | 3 |
| 01h | | 01h | 0(A) | 1(A) | 2 |
| 00h | | 00h | 0(A) | 0(A) | 1 |
| 3Fh | | 00h | 0(B) | −1(B) | 0 |
| 3Eh | | 01h | 1(B) | −1(B) | −1 |
| | | 02h | 2(B) | −1(B) | −2 |
| | | | | | |
| | 0 | | | | |
| | | | | | |
| 22h | | | | | |
| 21h | | 1Eh | P − 2(B) | −1(B) | −P+2 |
| 20h | | 1Fh | P − 1(B) | −1(B) | −P+1 |

Accordingly, the delay 121 and the first selector 122 are halved to reduce the number of gates, as compared with the conventional physical random number generator needing two delays corresponding to two signal lines and the selector, whereby the physical random number generator 101 is reduced in the scale, with the smaller occupancy area and consumption power.

Figure 19:
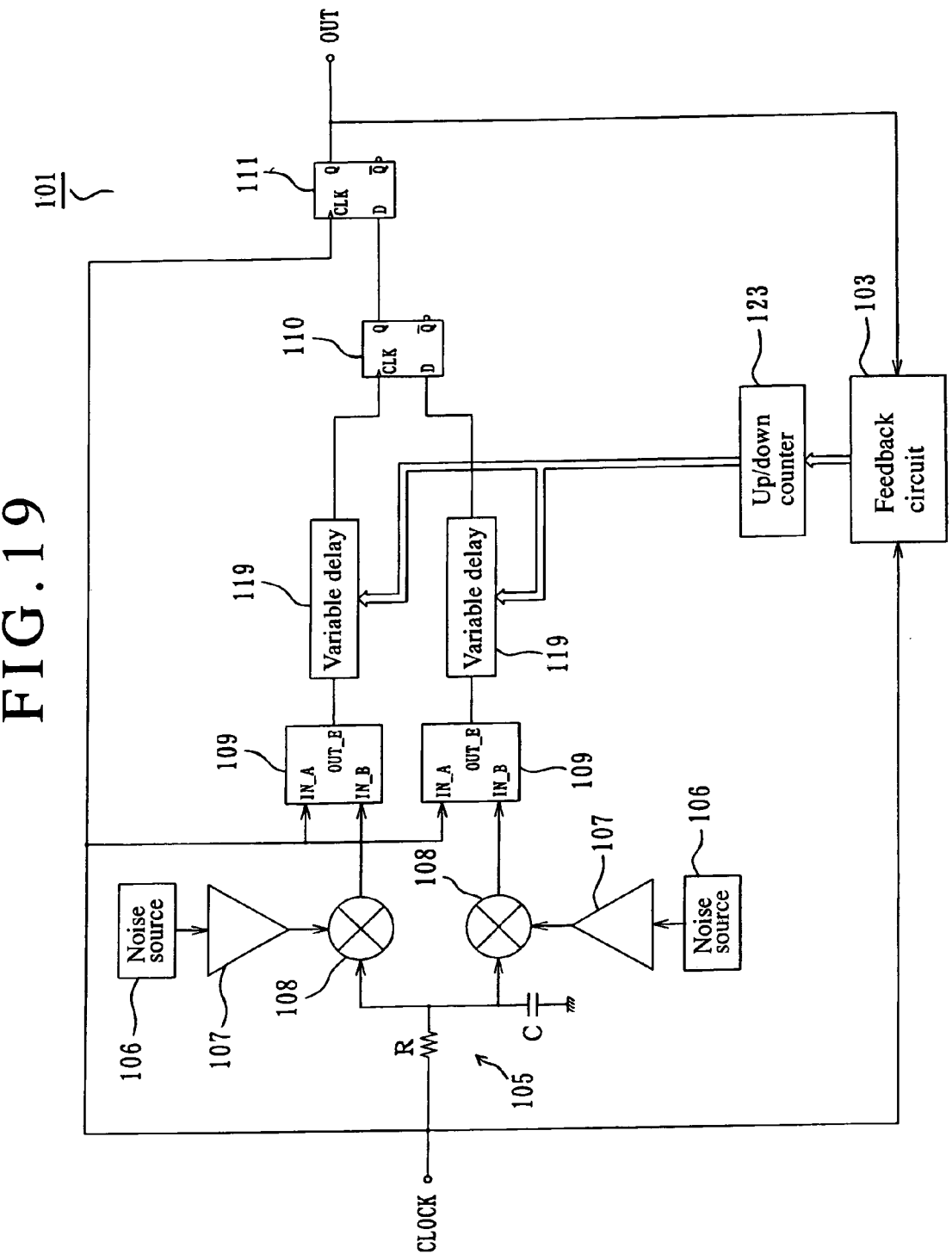
FIG. 19 is a circuit diagram showing another form of the physical random number generator according to the invention.

FIG. 19 is a circuit diagram of the physical random number generator according to another embodiment of the invention. This physical random number generator 101 comprises one integration circuit 105 for integrating the clock signal through a resistor R and a capacitor C to output an integral waveform, two noise sources 106, two amplifiers 107 for amplifying the noise of the noise source 106 to output a noise signal, two mixers 108 for mixing the integral waveform and the noise signal, and two edge detection circuits 109 for detecting the first edge of jitter generated based on an output waveform of the mixer 108, as shown in FIG. 19. A D-type flip-flop 110 for outputting "0" or "1" based on a phase difference in the output signal between each edge detection circuit 109 is provided at the latter stage of each edge detection circuit 109. Furthermore, a D-type flip-flop 111 for synchronizing the random numbers with the clock signal is provided at the latter stage of the flip-flop 110.

Also, a variable delay 119 composed of a delay and a selector is provided between the flip-flop 110 and each edge detection circuit 109 (the latter stage of each edge detection circuit 109) to adjust the phase of an input signal input into the flip-flop 110.

Moreover, a feedback circuit 103 is provided between the output of the flip-flop 111 and the up/down counter 123, and feeds back the output of the flip-flop 111 to the variable delay 119 so that "0" or "1" output from the flip-flop 111 may converge to 50%.

Accordingly, one integration circuit 105 is only required for two signal lines, and the phase adjustment range due to an error in the resistor R and the capacitor C making up the integration circuit 105 is narrowed, whereby the variable delay 119 composed of the delay and the selector is reduced to have a smaller number of gates, whereby the physical random number generator 101 is reduced in the scale, with the smaller occupancy area and consumption power.

Figure 20:
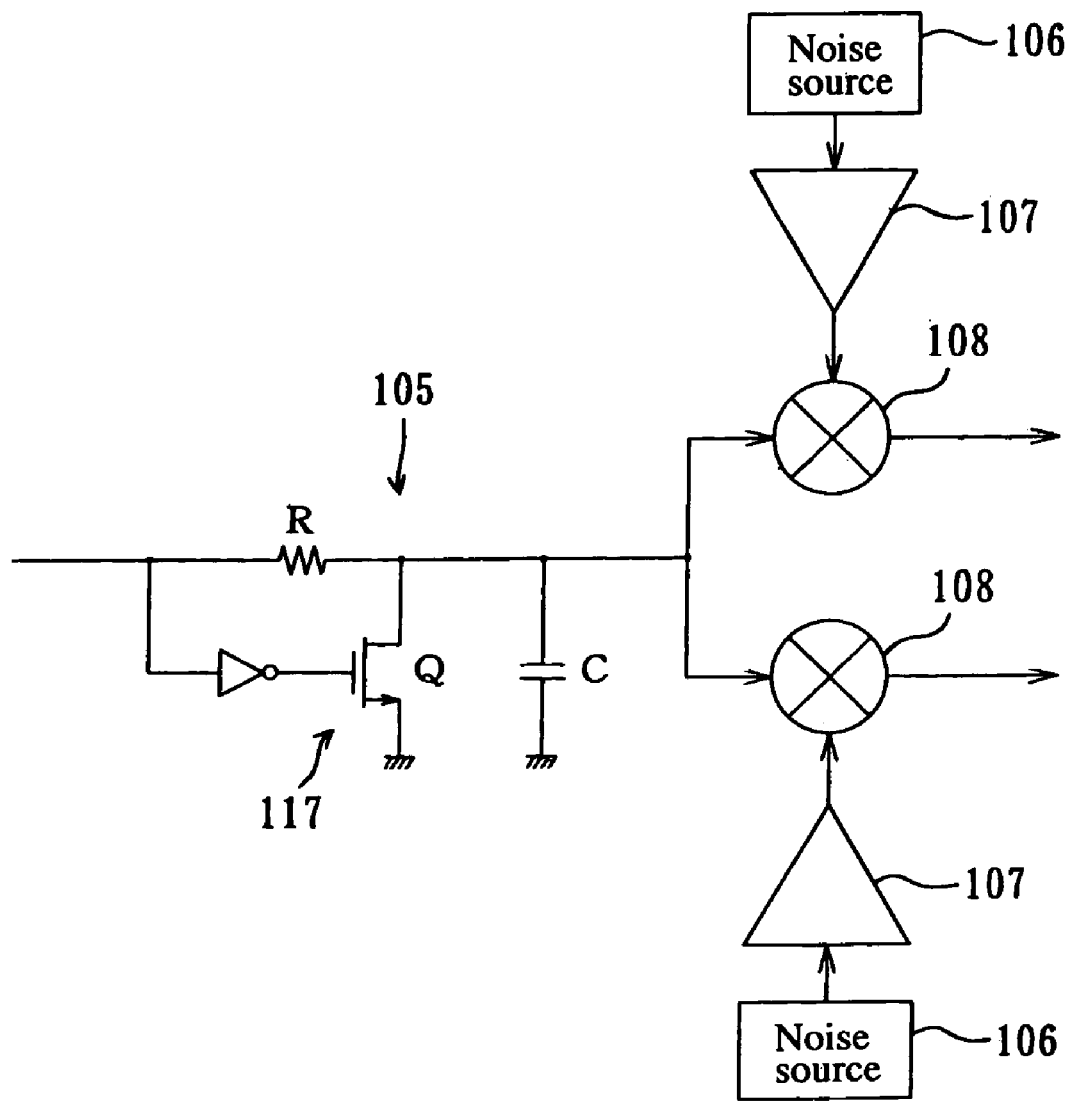
FIG. 20 is a circuit diagram showing one example of an integration circuit.
Figure 21:
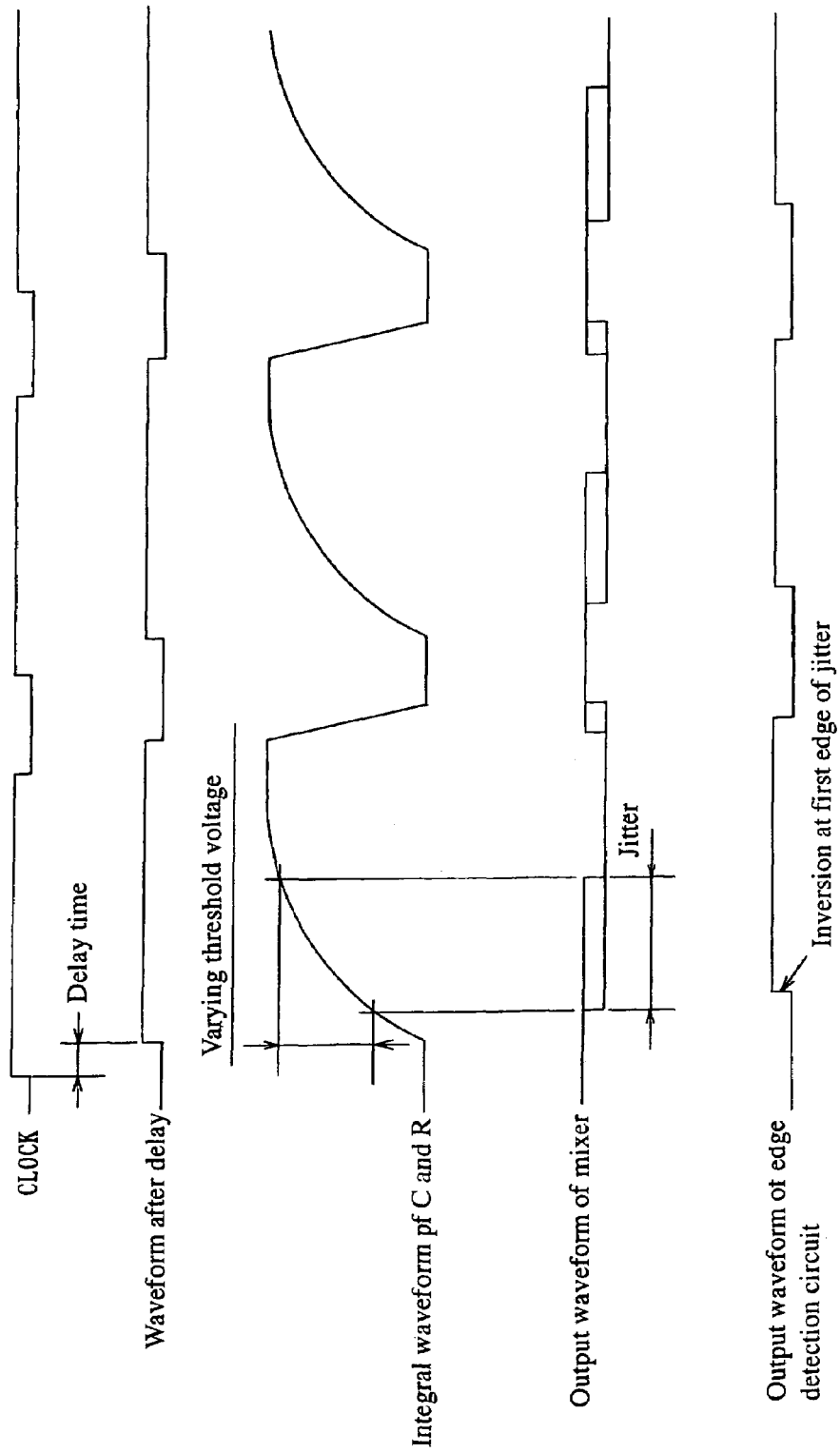
FIG. 21 is a chart showing the operation waveforms of the physical random number generator using the integration circuit as shown in FIG. 20.

In the above embodiment as shown in FIG. 19, an FET (Field Effect Transistor) 117 may be provided in parallel with the capacitor C at the latter stage of the resistor R in the integration circuit 105, as shown in FIG. 20. In this case, the capacitor C in the integration circuit 105 is discharged to restore the potential to the origin of the integral waveform 105, so that the origin of the integral waveform is always stabilized, and the jitter distribution is also stabilized, as shown in FIG. 21. Moreover, since the jitter distribution is stabilized, the random numbers of excellent quality are generated. Though the random number generation must wait until the potential returns to the origin, because the capacitor C of the integration circuit 105 is discharged at high rate, and the potential returns to the origin of integral waveform fast, the wait time for the random number generation is shortened. In addition, the potential can be compulsorily decreased to the origin without waiting for the potential of waveform to rise fully after the random number generation, further shortening the time (if random numbers are generated, the potential can be returned to the origin at once). Thereby, the random number generating rate can be greatly increased. Similarly, the FET 117 may be provided in parallel with the capacitor C at the latter stage of the resistor R in each integration circuit 105 in the embodiment as shown in FIGS. 16 to 18.

Figure 22:
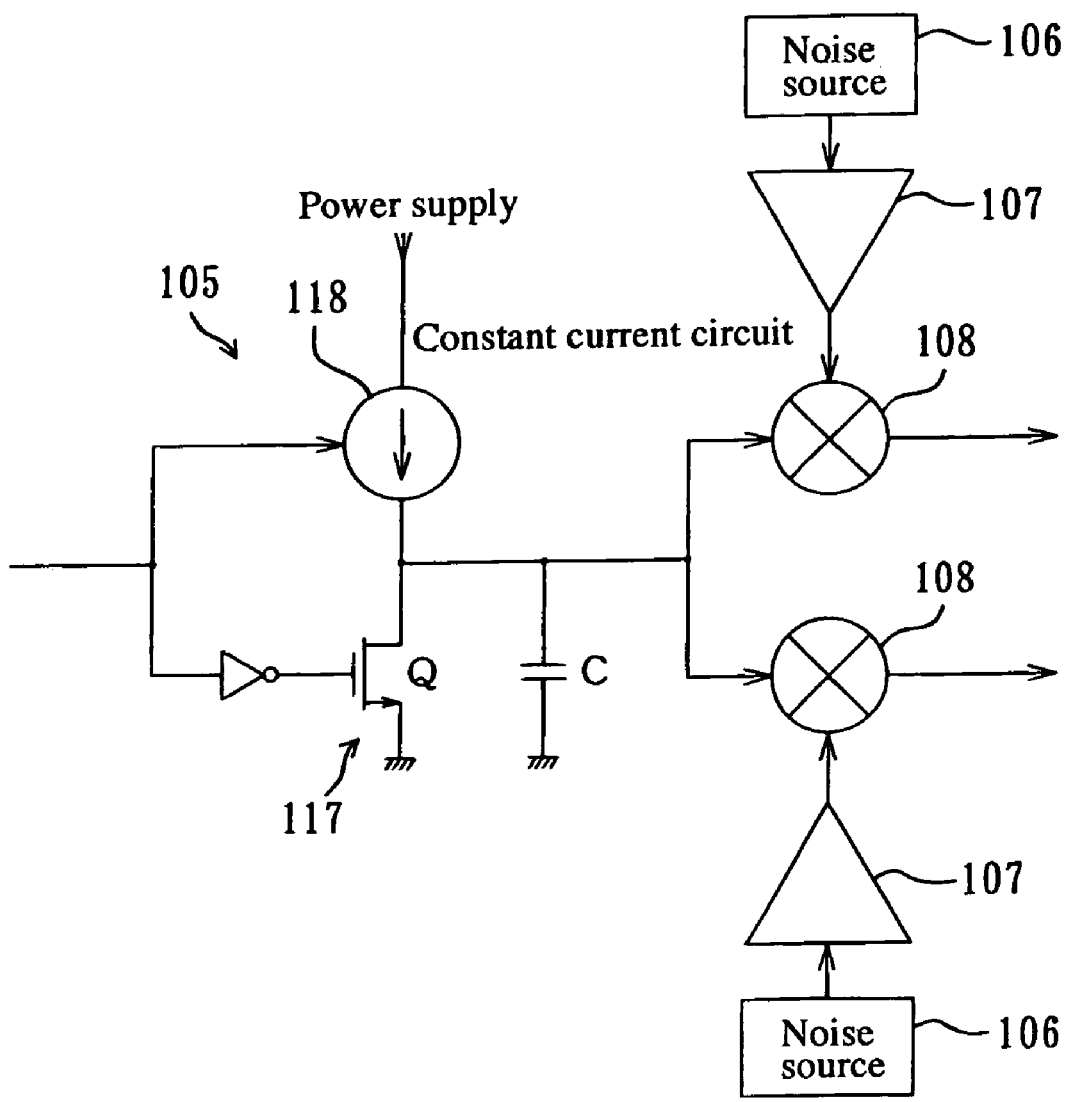
FIG. 22 is a diagram showing another example of the integration circuit.

Also, in the embodiment as shown in FIG. 19, a constant current circuit 118 may be provided, instead of the resistor R of the integration circuit 105, as shown in FIG. 22. In this case, the integral waveform in charging the capacitor C is linear, without distortion in the jitter modulated with the noise, whereby the quality of random numbers is enhanced, as shown in FIG. 23. Similarly, the constant current circuit 118 may be provided, instead of the resistor R of each integration circuit 105, in the above embodiment as shown in FIGS. 16 to 18.

Also, k physical random number generators 101 (k is a number of 2 or greater) are connected in parallel, and the parallel physical random number input into each physical random number generator 101 is rearranged in k serial physical random numbers, and output via the exclusive OR (XOR) element, thereby enhancing the quality of random numbers of the physical random number generation device composed of plural physical random number generators 101, like the example of FIG. 3B.

Though in the embodiment of FIGS. 16 to 18 and the embodiment of FIG. 19, the D-type flip-flop is employed as the flip-flop for generating random numbers, the present invention is not limited to this form, but the flip-flop having the equivalent function may be substituted.

Also, though in the embodiment of FIG. 19, the variable delay 119 composed of the delay and the selector is provided at the latter stage of the edge detection circuit 109 as shown in FIG. 19, the variable delay 119 may be provided at the former stage of the edge detection circuit 109.

The invention claimed is:

1. A method of uniforming physical random numbers, comprising the steps of: inputting a plurality of physical random numbers to a random number holding device to hold the physical random numbers; inputting a part of the physical random numbers held in the random number holding device into addresses a selector; and randomly selecting and outputting, from the selector, a residual part of the physical random numbers, based on an address value of the part of the physical numbers input into the addresses of the selector.

2. The method of uniforming physical random numbers according to claim 1, further comprising: inputting the output of the selector and a physical random number to an exclusive OR circuit; and outputting an output of the exclusive OR circuit into the random number holding device, as a physical random number input into the random number holding device.

3. A method of uniforming physical random numbers, the method comprising uniforming physical random numbers at multiple stages by repeating the method of claim 1 for two or more cycles.

4. The method of uniforming physical random numbers according to claim 1, wherein the random number holding device is a shift register.

5. A physical random number generation device comprising a physical random number generator, the physical random number generator comprising:
a serial physical random number generator for generating a serial random number in accordance with a reference clock signal;
a serial/parallel converter for converting the serial random number to a parallel random number;
a plurality of registers capable of storing the parallel random number; and
a control circuit for (i) sequentially storing the parallel random number in the plurality of registers each time the parallel random number is generated by the serial/parallel converter, (ii) reading and outputting the parallel random number from the plurality of registers in accordance with a read clock signal, and (iii) successively updating contents of the plurality of registers by shifting the stored parallel random number from a register of the plurality of registers to another register of the plurality of registers, the other register being a register for which the reading of the parallel random number has completed.

6. The physical random number generation device according to claim 5, wherein the physical random number generator comprises:
an up/down counter for determining, from among the plurality of registers, a register to hold the parallel random number and outputting a write address; and
a selector for selecting the register to hold the parallel random number, the selection being made based on the write address output by the up/down counter, and the selector being for outputting a load signal based on the selection,
wherein the control circuit sequentially stores the parallel random numbers in the serial/parallel converter from a latter stage register to a former stage register, from among the plurality of registers, based on the load signal output from the selector, and reads and outputs the parallel random number from a last stage register, from among the plurality of registers, in accordance with the read clock signal, and sequentially shift the parallel random number within the former stage register to the latter stage register.

7. The physical random number generation device according to claim 5, wherein the physical random number generator comprises (i) total counter for counting a total number of serial random numbers generated by the serial physical random number generator, and (ii) a random number verification circuit for verifying a uniformity of random numbers, based on the serial random numbers, when the total number of serial random numbers counted by the total counter reaches a predetermined bit number.

8. The physical random number generation device according to claim 7, wherein a random number verification method of using the random number verification circuit comprises verifying the uniformity of random numbers by counting an appearance frequency of a random number value "0" or "1" and comparing the counted appearance frequency with a prescribed value.

9. The physical random number generation device according to claim 7, wherein a random number verification method for using the random number verification circuit comprises verifying the uniformity of random numbers by comparing a $\chi$ square value calculated based on an appearance frequency of each random number value with a prescribed value, wherein one random number value is 4 bits.

10. The physical random number generation device according to claim 7, wherein a random number verification method for using the random number verification circuit comprises verifying the uniformity of random numbers by counting an appearance frequency of string for every length of string and comparing each counted appearance frequency with a prescribed value.

11. The physical random number generation device according to claim 7, wherein a random number verification method for using the random number verification circuit comprises verifying the uniformity of random numbers by comparing a length of a longest string appearing in the random numbers of certain bits with a prescribed value.

12. The physical random number generation device according to claim 5, further comprising a plurality of physical random number generators, wherein a first physical random number generator is selected, from among the plurality of physical random number generators, based on a select signal of the selector, to output the random number or random number verification data.

13. A physical random number generator comprising:
two integration circuits, each integration circuit for integrating a clock signal through a resistor and a capacitor to output a respective integral waveform;

two noise sources;
two amplifiers, each amplifier for amplifying a noise from a respective noise source of the two noise sources, to output a respective noise signal;
two mixers, each mixer for mixing a respective integral waveform and a respective noise signal;
two edge detection circuits, each edge detection circuit for detecting a first edge of jitter generated based on an output waveform of a respective mixer of the two mixers;
a flip-flop for outputting "0" or "1" based on a phase differences between respective output signals output from the two edge detection circuits;
a phase adjuster for adjusting a phase of an input signal input into each integration circuit, the phase adjuster including a delay, a first selector and an up/down counter; and
a feedback circuit for feeding back the output of the flip-flop to the phase adjuster so that the "0" or the "1" output from the flip-flop converges to 50%;
wherein a second selector and a third selector are provided at a former stage of each integration circuit, respectively, and
wherein the physical random number generator includes a polarity switching circuit for switching a polarity of an input to the first selector, the second selector and the third selector by a most significant bit of the up/down counter.

14. The physical random number generator according to claim 13, wherein a FET (Field Effect Transistor) is additionally provided in parallel to the capacitor of each integration circuit at a latter stage of the resistor of each integration circuit.

15. A physical random number generation device wherein two or more physical random number generators according to claim 13 are connected in parallel, such that physical random numbers input into each physical random number generator are input to each physical random number generator in parallel and are rearranged by the physical random number generators into serial physical random numbers that are output from the physical random number generators in serial form.

16. A physical random number generator comprising:
one integration circuit for integrating a clock signal through a resistor and a capacitor to output an integral waveform;
two noise sources;
two amplifiers, each amplifier for amplifying a noise from a respective noise source of the two noise sources, to output a respective noise signal;
two mixers, each mixer for mixing the integral waveform and a respective noise signal;
two edge detection circuits, each edge detection circuit for detecting a first edge of jitter generated based on an output waveform of a respective mixer of the two mixers; and
a flip-flop for outputting "0" or "1" based on a phase differences between respective output signals output from the two edge detection circuits;
wherein a variable delay, including a delay and a selector, for adjusting a phase of an input signal input into the flip-flop is provided at a former or latter stage of each edge detection circuit, and
wherein the physical random number generator includes a feedback circuit for feeding back the output of the flip-flop to the variable delay so that the "0" or the "1" output from the flip-flop converges to 50%.

17. The physical random number generator according to claim 16, wherein a FET (Field Effect Transistor) is additionally provided in parallel to the capacitor of each integration circuit at a latter stage of the resistor of each integration circuit.

18. A physical random number generation device wherein two or more physical random number generators according to claim 16 are connected in parallel, such that the physical random numbers input into each physical random number generator are input to each physical random number generator in parallel and are rearranged by the physical random number generators into serial physical random numbers that are output from the physical random number generators in serial form.

19. A physical random number generator comprising:
two integration circuits, each integration circuit for integrating a clock signal using a constant current circuit and a capacitor to output a respective integral waveform;
two noise sources;
two amplifiers, each amplifier for amplifying a noise from a respective noise source of the two noise sources, to output a respective noise signal;
two mixers, each mixer for mixing a respective integral waveform and a respective noise signal;
two edge detection circuits each edge detection circuit for detecting a first edge of jitter generated based on an output waveform of a respective mixer of the two mixers;
a flip-flop for outputting "0" or "1" based on a phase difference between respective output signals output from the two edge detection circuits;
a phase adjuster for adjusting a phase of an input signal input into each integration circuit, the phase adjuster including a delay, a first selector and an up/down counter; and
a feedback circuit for feeding back the output of the flip-flop to the phase adjuster so that the "0" or the "1" output from the flip-flop converges to 50%;
wherein a second selector and a third selector are provided at a former stage of each integration circuit, respectively, and
wherein the physical random number generator includes a polarity switching circuit for switching a polarity of an input to the first selector, the second selector and the third selector by a most significant bit of the up/down counter.

20. A physical random number generator comprising:
one integration circuit for integrating a clock signal using a constant current circuit and a capacitor to output an integral waveform;
two noise sources;
two amplifiers each amplifier for amplifying a noise from a respective noise source of the two noise sources, to output a respective noise signal;
two mixers, each mixer for mixing the integral waveform and a respective noise signal;
two edge detection circuits, each edge detection circuit for detecting a first edge of jitter generated based on an output waveform of a respective mixer of the two mixers; and
a flip-flop for outputting "0" or "1" based on a phase difference between respective output signals output from the two edge detection circuits;
wherein a variable delay, including a delay and a selector, for adjusting a phase of an input signal input into the flip-flop is provided at a former or latter stage of each edge detection circuit, and
wherein the physical random number generator includes a feedback circuit for feeding back the output of the flip-flop to the variable delay so that the "0" or the "1" output from the flip-flop converges to 50%.

* * * * *